(12) United States Patent
Nishikawa

(10) Patent No.: US 7,911,640 B2
(45) Date of Patent: Mar. 22, 2011

(54) INFORMATION PROCESSING APPARATUS, PRINTING DATA GENERATION METHOD, AND PRINTING CONTROL PROGRAM

(75) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1188 days.

(21) Appl. No.: 10/699,876

(22) Filed: Nov. 4, 2003

(65) Prior Publication Data

US 2004/0090644 A1    May 13, 2004

(30) Foreign Application Priority Data

Nov. 11, 2002  (JP) .................................. 2002-327145

(51) Int. Cl.
*G06K 15/00* (2006.01)
*G06K 15/02* (2006.01)
*G06F 17/00* (2006.01)

(52) U.S. Cl. ...................... 358/1.18; 358/1.15; 358/1.13; 358/1.16; 358/1.9; 358/1.12; 715/204

(58) Field of Classification Search ................. 358/1.15, 358/1.13, 1.16, 1.9, 1.12, 1.18; 400/61; 709/201; 715/204

See application file for complete search history.

(56) References Cited

U.S. PATENT DOCUMENTS

| 6,041,200 | A | * | 3/2000 | Glass et al. ...................... 399/82 |
| 6,120,197 | A | * | 9/2000 | Kawamoto et al. ............. 400/61 |
| 6,301,013 | B1 | * | 10/2001 | Momose et al. ............. 358/1.15 |
| 6,934,046 | B1 | | 8/2005 | Nishikawa et al. |
| 7,046,385 | B2 | | 5/2006 | Mori et al. |
| 7,061,632 | B1 | * | 6/2006 | Livingston ................... 358/1.15 |

(Continued)

FOREIGN PATENT DOCUMENTS

JP    8-244289    9/1996

(Continued)

OTHER PUBLICATIONS

Office Action, dated Sep. 26, 2008, in JP 2002-327145.

*Primary Examiner* — King Y Poon
*Assistant Examiner* — Lawrence E Wills
(74) *Attorney, Agent, or Firm* — Fitzpatrick, Cella, Harper & Scinto

(57) ABSTRACT

This invention provides an information processing apparatus having a generation function of generating printing data to be transmitted to a printer, including a storage which saves printing data of each original page in an intermediate format together with printing setting data, a printing controller which causes the user to change a printing setting and issue a printing instruction, and a printing data reading unit which reads out the printing setting data from the storage in accordance with the printing instruction, changes the color mode setting of the read printing setting data in accordance with the color mode setting in the printer that is changed by the printing controller, and generates by using the generation function the printing data containing an instruction of changing the color mode on the basis of the printing setting data.

9 Claims, 23 Drawing Sheets

U.S. PATENT DOCUMENTS

| | | | |
|---|---|---|---|
| 7,154,627 B2 | 12/2006 | Nishikawa et al. | |
| 7,159,190 B2 * | 1/2007 | Perry | 715/825 |
| 7,184,165 B2 | 2/2007 | Mori et al. | |
| 7,307,749 B2 | 12/2007 | Nishikawa et al. | |
| 7,685,517 B2 * | 3/2010 | Tomita et al. | 715/276 |
| 7,760,379 B2 * | 7/2010 | Owen | 358/1.15 |
| 2001/0044868 A1 * | 11/2001 | Roztocil et al. | 710/129 |
| 2002/0113989 A1 * | 8/2002 | Ferlitsch et al. | 358/1.15 |
| 2003/0053107 A1 | 3/2003 | Kizaki et al. | 358/1.13 |
| 2004/0061897 A1 * | 4/2004 | Onishi | 358/1.15 |
| 2004/0111675 A1 * | 6/2004 | Mori et al. | 715/513 |
| 2004/0187081 A1 * | 9/2004 | Petz | 715/526 |
| 2007/0146767 A1 * | 6/2007 | Sakura | 358/1.14 |

FOREIGN PATENT DOCUMENTS

| | | |
|---|---|---|
| JP | 10-285421 | 10/1998 |
| JP | 2001084245 A | 3/2001 |
| JP | 2001-134395 | 5/2001 |
| JP | 2002-183528 A | 6/2002 |
| JP | 2002-200814 | 7/2002 |
| WO | WO 02082362 A2 * | 10/2002 |

* cited by examiner

FIG. 10

PRINT

PRINTER NAME (N): Canon iR C3200 LIPS ▶ PROPERTIES (P)...

☐ LIMIT PRINT FORMAT IN ACCORDANCE WITH FUNCTION OF SELECTED DEVICE (E)

LIST OF UNUSABLE FUNCTIONS:

COPIES (C): 1 ☑ COLLATE (O)

☐ VARIABLE PRINTING (V)
◉ PRINT ALL RECORDS (R)
○ PRINT ONLY DESIGNATED RECORDS (S) [    ] RECORDS

DESIGNATE PRINTING RANGE (T): DOCUMENT (ALL) ▶

[ OK ]  [ CANCEL ]  [ HELP (H) ]

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4+A3", "B4+B3", OR "LETER+LEDGER (11×17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | • ON / OFF CAN BE AUTOMATICALLY DESIGNATED WHEN PAPER SIZE IS FIXED SIZE OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 17B

| | | |
|---|---|---|
| 8 | HEADER / FOOTER | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DELIVERY METHOD | STAPLING / PUNCH HOLE | • STAPLING / PUNCHING ONLY IN SINGLE- / DOUBLE-SIDED PRINTING<br>• STAPLING AT ONE / TWO PORTIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING PRINTING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |
| 15 | COLOR TYPE | | • COLOR PRINTING SETTING OR MONOCHROME PRINTING SETTING IS DESIGNATED FOR WHOLE DOCUMENT |

FIG. 18

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER.<br>PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON / OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK<br>DEFAULT VALUE IS "ON" |
| 8 | COLOR TYPE | | • COLOR PRINTING SETTING OR MONOCHROME PRINTING SETTING IS DESIGNATED FOR EACH CHAPTER |

FIG. 19

| NO | ATTRIBUTE INFORMATION | | REMARKS |
|----|----------------------|--|---------|
| 1 | PAGE ROTATION DESIGNATION | | • 0°/90°/180°/270° CAN BE DESIGNATED |
| 2 | WATERMARK | DISPLAY/NON-DISPLAY | • WHETHER TO DISPLAY ALL WATERMARKS DESIGNATED BY BOOK IS DESIGNATED |
| 3 | HEADER/FOOTER | DISPLAY/NON-DISPLAY | • WHETHER TO DISPLAY ALL HEADERS/FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |
| 9 | COLOR TYPE | | • COLOR PRINTING SETTING OR MONOCHROME PRINTING SETTING IS DESIGNATED FOR EACH PAGE |

INFORMATION PROCESSING APPARATUS, PRINTING DATA GENERATION METHOD, AND PRINTING CONTROL PROGRAM

FIELD OF THE INVENTION

The present invention relates to an information processing apparatus and printing control method and, more particularly, to a printing system which uses a personal computer or the like and generates printing data for causing an output apparatus such as a printer to perform printing processing.

BACKGROUND OF THE INVENTION

It is conventionally popular to connect a printer and an information processing apparatus such as a personal computer into a printing system, and transmit printing data from the information processing apparatus to the printer to print. Some information processing apparatuses have a function of temporarily saving (spooling) data in a data format different from the format of printing data before generating printing data in a format (e.g., printer control language) processible by the printer. The temporary save data format is a format which is called an intermediate format independently of an application, printer description language, or the like. Data of the intermediate format (to be also referred to as intermediate data or intermediate code) can be converted into formats processible by various printers.

In an information processing apparatus of this type, data which is temporarily saved as an intermediate code is read out by a despool means, and printing data of a format to be finally transmitted to a printer is generated by a printer driver. This data format is a string of printer control commands to the printing apparatus, and transmitted to the printer for each printing job.

A representative known technique of a system including such information processing apparatus and printer is disclosed in Japanese Patent Laid-Open No. 10-285421. When a color printer is used in this system, the printer driver provides a function of causing the user to set color or monochrome printing for each printing job. The printer driver also provides an auto-color function of determining whether a page to be printed contains color data, and if so, setting color printing for the page; otherwise, setting monochrome printing. When a printing job having color or monochrome setting is transmitted to the printer, the printer prints in a color mode or monochrome mode in accordance with the setting.

This printing system, however, cannot perform color or monochrome setting for each page in accordance with user's designation.

For example, when a document is created by a DTP (Desk-Top Publishing) application, a page containing a color figure or color image and a page substantially formed by a text generally coexist. In printing such document, a figure or image is often preferably printed in color, but a text suffices to be printed in monochrome.

In some cases, a page substantially formed by a text contains an annotation which is created in color such as red by the DTP application. Although the user wants to print such page in monochrome, the page is determined as a color page because of the red annotation, and color printing is set in printing processing using the auto-color function provided by the printer driver. As a result, the user is charged the color printing fee for the page.

By monochrome setting for the entire printing job, monochrome printing can also be set for such page. In this case, monochrome printing is also set for even a page to be printed in color.

If the user wants to divide pages to be printed in color and pages to be printed in monochrome, he/she must separately designate pages to be printed in color and pages to be printed in monochrome in designating printing through the DTP application program. In this case, not only the operation becomes cumbersome, but also the user must arrange printouts. Even if the printer has optional functions such as a sorting function and stapling function, the user cannot utilize them.

In the prior art, the user cannot set color printing or monochrome printing for each page, posing many problems.

SUMMARY OF THE INVENTION

The present invention has been made to overcome the conventional drawbacks, and has as its object to provide a mechanism capable of designating color printing or monochrome printing for a page desired by the user in a document of pages that is created by an application, and performing printing processing designated by the user.

To achieve the above object, the present invention comprises the following arrangement.

A printing control apparatus having a generation function of generating printing data to be transmitted to a printer comprises save means for saving printing data of each original page in an intermediate format together with printing setting data, printing control means for causing a user to change a printing setting and issue a printing instruction, and printing data reading means for reading out the printing setting data from the save means in accordance with the printing instruction, changing a color mode setting of the read printing setting data in accordance with a color mode setting in the printer that is changed by the printing control means, and generating by using the generation function the printing data containing an instruction of changing the color mode on the basis of the printing setting data.

In this arrangement, a color/monochrome instruction can be issued in accordance with a changed setting.

The printing setting changed by the printing controller preferably includes the color mode setting of each original page in the printer, and the printing data reading unit preferably changes the color mode setting of the read printing setting data for each printing medium including the original page whose printing setting has been changed.

The printing setting changed by the printing controller preferably includes the color mode setting of each chapter formed by a plurality of original pages in the printer, and the printing data reading unit preferably changes the color mode setting of the read printing setting data for a set of printing media corresponding to the chapter whose printing setting has been changed.

The printing data reading unit preferably determines whether the printer copes with a change of the color mode before the printing data containing the instruction of changing the color mode is generated by using the generation function, when the printer copes with the change, generates, by using the generation function, printing data containing the instruction of changing the color mode, and when the printer does not cope with the change, generates, by using the generation function, printing data containing no instruction of changing the color mode.

The printing data reading unit preferably determines whether the printing setting changed by the printing controller includes the color mode setting of each original page in the printer, when the printing setting includes the color mode setting of each original page, changes the color mode setting of the read printing setting data for each printing medium including the original page whose printing setting has been changed, when the printing setting does not include the color mode setting of each original page, determines whether the printing setting includes the color mode setting of each chapter formed by a plurality of original pages in the printer, when the printing setting includes the color mode setting of each chapter, changes the color mode setting of the read printing setting data for a set of printing media corresponding to the chapter whose printing setting has been changed, and when the printing setting does not include the color mode setting of each chapter, changes the color mode setting of the whole printing data in the printer.

Alternatively, to achieve the above object, the present invention comprises the following arrangement.

An information processing apparatus which generates printing data to be transmitted to a printer, comprises a save unit which saves document data to be printed together with printing setting data;

a printing setting unit which sets in printing setting data a color mode of whether color printing or monochrome printing is performed for a predetermined unit of document data; and printing data generation means for generating the printing data by issuing a color mode designation instruction in order to change the color mode for the predetermined unit on the basis of the printing setting data.

The save unit preferably converts data input from an application, and stores the converted data as the document data of an intermediate format in a document file.

The save unit preferably manages the document data by a tree structure having a plurality of chapters defined by dividing the document data into a plurality of original pages.

The printing setting unit preferably can set designation of the color mode for each original page, each chapter, and the whole document data.

The printing setting unit preferably can designate whether the color mode for a chapter of the document data is set to the color mode of the whole document data or separately set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing another example of the printing control application UI;

FIGS. 17A and 17B are tables showing a list of book attributes;

FIG. 18 is a table showing a list of chapter attributes;

FIG. 19 is a table showing a list of page attributes;

DETAILED DESCRIPTION OF THE PREFERRED EMBODIMENTS

First Embodiment

Figure 1:
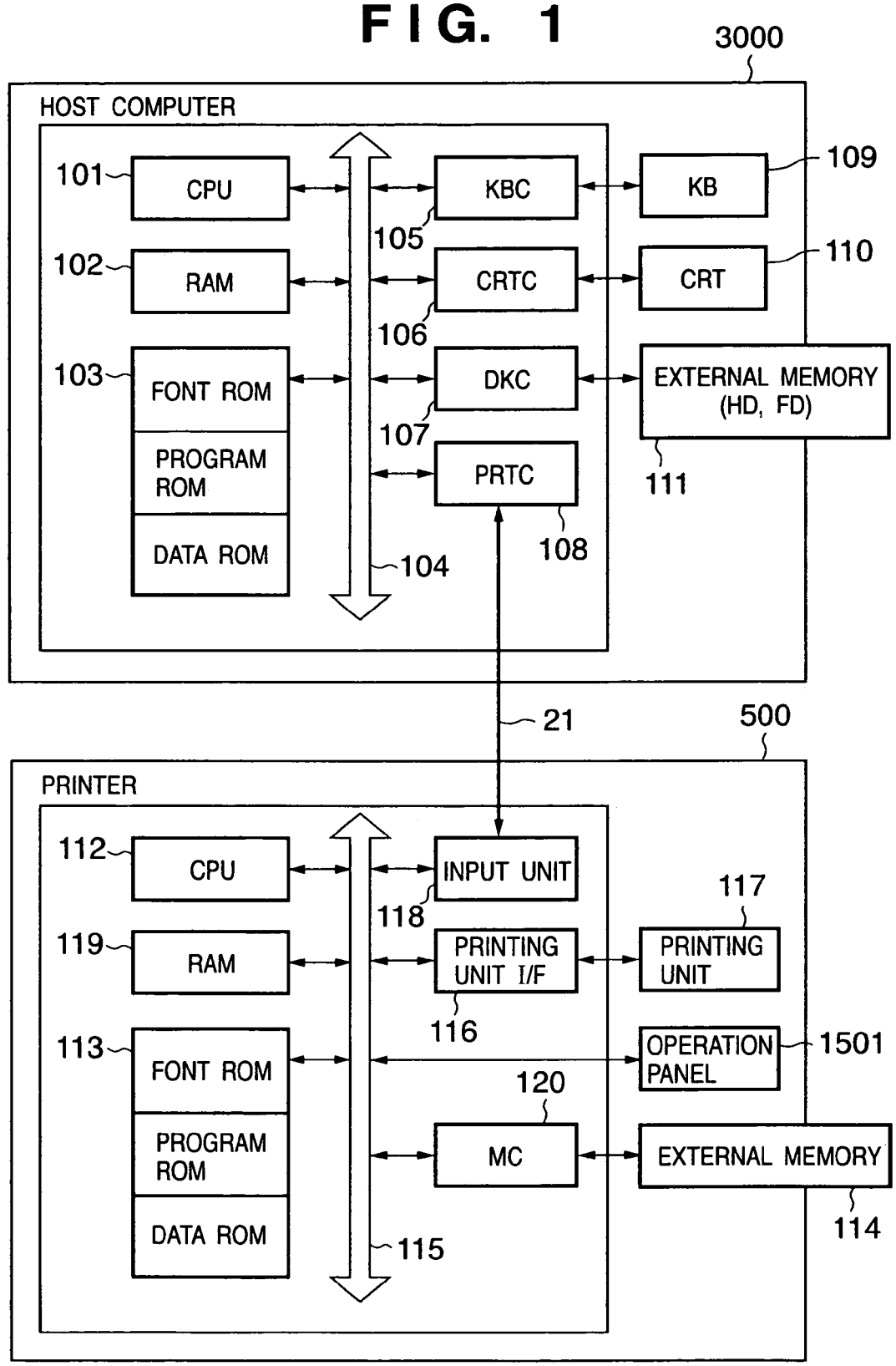
FIG. 1 is a block diagram for explaining the arrangement of a printing control apparatus according to an embodiment of the present invention.

A printer control system according to a preferred embodiment of the present invention will be described. FIG. 1 is a block diagram for explaining the configuration of the printer control system. The present invention can be applied to a single apparatus, a system comprised of a plurality of devices, or a system which is connected via a network such as a LAN or WAN and performs processing, as far as the function of the present invention is executed.

In FIG. 1, a host computer 3000 comprises a CPU 101, RAM 102, ROM 103, and the like. The CPU 101 executes document processing in which figures, images, characters, tables (including spreadsheets and the like), and the like coexist, on the basis of a document processing program or the like stored in the program ROM of the ROM 103 or an external memory 111. The CPU 101 comprehensively controls devices connected to a system bus 104. The program ROM area of the ROM 103 or the external memory 111 stores, e.g., an operating system program (to be referred to as an OS hereinafter) serving as the control program of the CPU 101. The font ROM area of the ROM 103 or the external memory 111 stores, e.g., font data used in document processing. The data ROM area of the ROM 103 or the external memory 111 stores various data used in document processing or the like. The RAM 102 functions as a main memory, work area, or the like for the CPU 101.

A keyboard controller (KBC) 105 controls a key input from a keyboard 109 or a pointing device (not shown). A CRT controller (CRTC) 106 controls the display of a CRT display (CRT) 110. A disk controller (DKC) 107 controls access to the external memory 111 such as a hard disk (HD) or flexible disk (FD). The external memory 111 stores a boot program, various applications, font data, user files, edited files, a printer control command generation program (to be referred to as a printer driver hereinafter), and the like. A printer controller (PRTC) 108 is connected to a printer 500 via a bidirectional interface (interface) 121, and executes communication control processing with the printer 500.

The CPU 101 executes, e.g., rasterization processing of an outline font to a display information RAM set in the RAM 102, and enables WYSIWYG on the CRT display 110. The CPU 101 opens various registered windows and executes various data processes on the basis of commands designated on the CRT 110 with a mouse cursor (not shown) or the like. When the user executes printing, he/she opens a printing setting window provided by the printer driver, and can perform setting of a printer and setting of a printing processing method to the printer driver that includes selection of a printing mode.

The printer 500 is controlled by a CPU 112. The printer CPU 112 outputs an image signal as output information to a printing unit (printer engine) 117 connected to a system bus 115 on the basis of a control program stored in the program ROM area of a ROM 113 or a control program stored in an external memory 114. The program ROM area of the ROM 113 stores, e.g., the control program of the CPU 112. The font ROM area of the ROM 113 stores, e.g., font data used to generate the output information. The data ROM area of the ROM 113 stores, e.g., information used in the host computer for a printer having no external memory 114 such as a hard disk.

The CPU 112 can communicate with the host computer via an input unit 118, and notify the host computer 3000 of internal printer information or the like. A RAM 119 functions as a main memory, work area, or the like for the CPU 112, and the memory capacity can be expanded by an optional RAM connected to an expansion port (not shown). The RAM 119 is used as an output information mapping area, environment data storage area, NVRAM, or the like. Access to the external memory 114 such as a hard disk (HD) or IC card is controlled by a memory controller (MC) 120. The external memory 114 is connected as an option, and stores font data, emulation programs, form data, and the like. Reference numeral 1501 denotes an operation panel having operation switches, an LED display, and the like.

The number of external memories 114 is not limited to one, and a plurality of external memories 114 may be arranged. A plurality of external memories which store an option card and a program for interpreting the printer control languages of different language systems in addition to built-in fonts may be connected. Further, an NVRAM (not shown) may be adopted to store printer mode setting information from the operation panel 1501.

Figure 2:
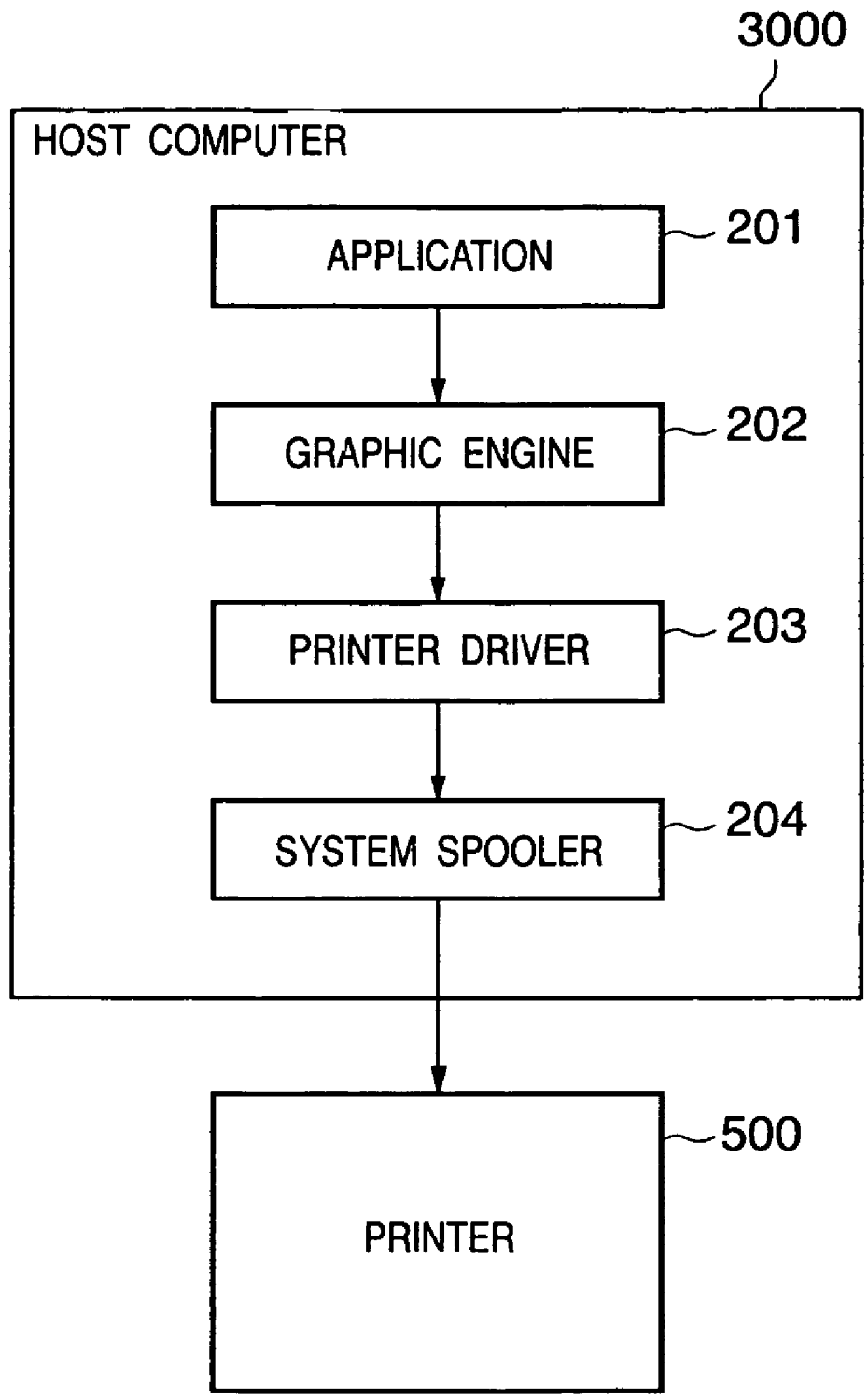
FIG. 2 is a block diagram showing the configuration of a typical printing system in a host computer which is connected to a printer.

FIG. 2 is a block diagram showing the software configuration of a conventional typical printing processing system in a host computer which is connected to a printing apparatus such as a printer directly or via a network. An application 201, graphic engine 202, printer driver 203, and system spooler 204 are program modules which are saved as program files in the external memory 111. These program modules are executed by loading them to the RAM 102 by an OS (Operating System) or another module which utilizes them. The application 201 and printer driver 203 can be added to an FD or CD-ROM serving as the external memory 111 or to an HD serving as the external memory 111 via a network (not shown). The application 201 saved in the external memory 111 is loaded to the RAM 102 and executed. In printing from the printer 500 by the application 201, data is output (drawn) by using the graphic engine 202 which is similarly loaded to the RAM 102 and can be executed.

The application 201 is an application program which provides functions such as wordprocessing, spreadsheet, photo-retouch, draw, paint, presentation, and text editing. The application 201 has a printing function. Such applications utilize a predetermined interface provided by the OS (Operating System) in printing application data such as created document data or image data. To print created data, the application 201 transmits an output command which is determined in advance for the output module of the interface-providing OS and has an OS-dependent format. The output module which has received the output command converts the command into a format processible by an output device such as a printer, and outputs the converted command. Since the format processible by the output device changes depending on the type of device, the manufacturer, and the model, a device driver is provided for each device. The OS uses the device driver to convert a command. When the OS is Microsoft Windows®, the output module is a GDI (Graphic Device Interface) module.

When the OS is Windows®, the graphic engine 202 corresponds to a GDI. The graphic engine 202 loads the printer driver 203 prepared for each printing apparatus from the external memory 111 to the RAM 102, and sets the printer driver 203 as the output destination of the application 201. For example, in Windows®, the graphic engine 202 converts a GDI (Graphic Device Interface) function received from the application 201 into a DDI (Device Driver Interface) function, and outputs the DDI function to the printer driver 203.

Based on the DDI function received from the graphic engine 202, the printer driver 203 generates a control command such as PDL (Page Description Language) which can be recognized by the printer. The generated printer control command is spooled by the system spooler 204 loaded to the RAM 102 by the OS, and output as printing data to the printer 500 via an interface 121.

Configuration of Printing System According To First Embodiment

Figure 3:
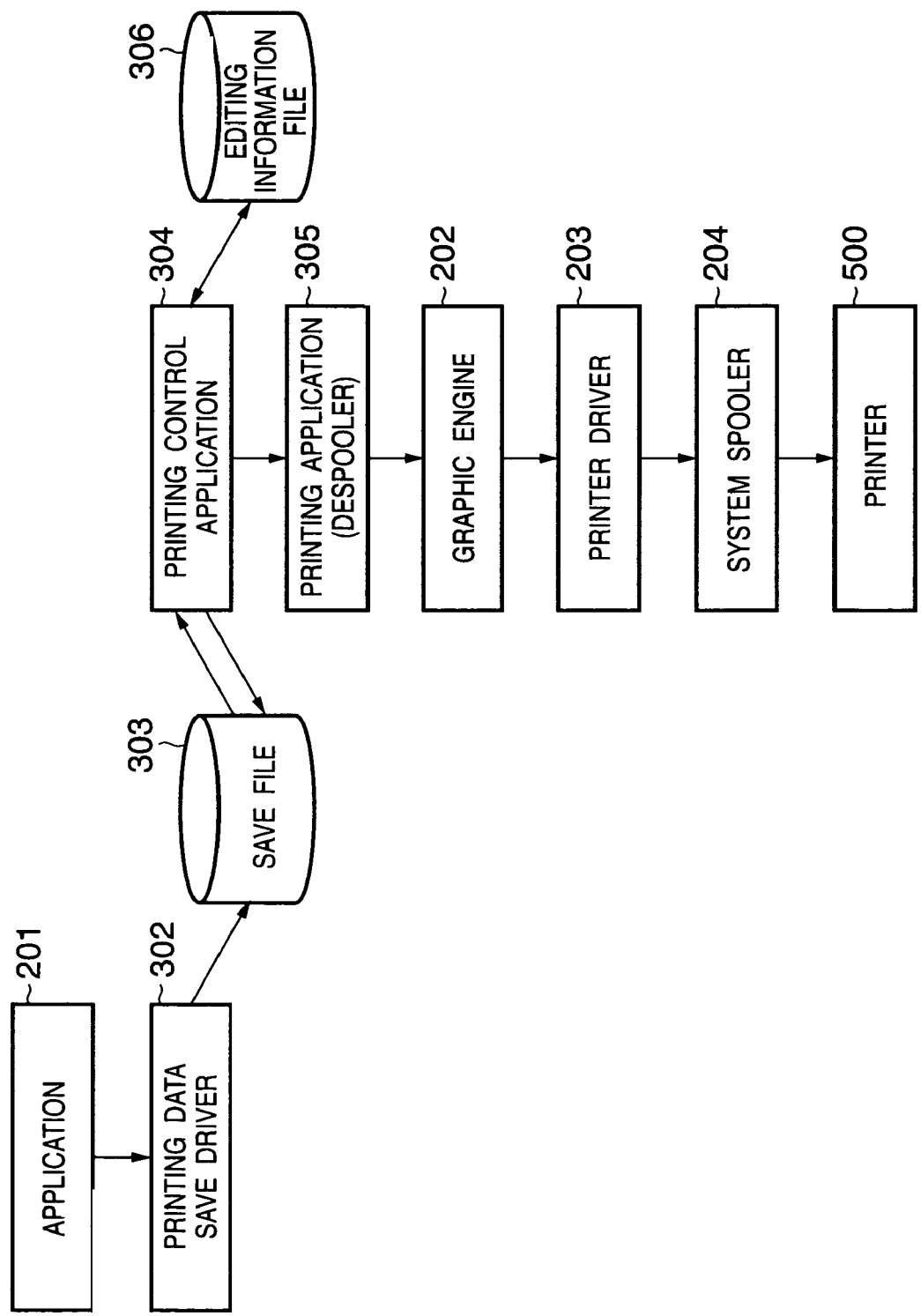
FIG. 3 is a block diagram showing the configuration of a printing system which spools an intermediate code before a printing command from an application is converted into a printer control command.

In addition to the printing system which is comprised of the printer and host computer shown in FIG. 2, the printing system according to the first embodiment has an arrangement of saving printing data from an application as intermediate code data (document file), as shown in FIG. 3. Note that data contained in the document file will also be referred to as a document file.

FIG. 3 shows an expanded configuration of the system in FIG. 2. In transmitting a printing command from the graphic engine 202 to the printer driver 203, a document file 303 of intermediate codes is generated. More specifically, as shown in FIG. 3, a printing data save driver 302, the document file 303, a printing control application 304, a printing application 305, and an editing information file 306 are interposed between the application 201 and the graphic engine 202.

Note that data contained in the editing information file will also be referred to as an editing information file. In the first embodiment, the document file 303 and editing information file are processed as separate files, but when no file is opened, are combined as an archive file in order to hold the unity.

In the system shown in FIG. 3, data contents saved in the document file 303 can be processed. This realizes a function which is not provided to an application, such as a function of enlarging/reducing printing data from an application or a function of reducing a plurality of pages into one page and printing the page. For this purpose, the system in FIG. 2 is so expanded as to spool intermediate code data, as shown in FIG. 3. Processing of printing data is generally set through a window provided by the printing control application 304, and the setting contents are saved in the RAM 102 or external memory 111.

As shown in FIG. 3, according to the expanded processing method, printing data from an application 301 is saved as the document file 303 in the system via the printing data save driver 302. The document file 303 is also called an intermediate file, and contains content data of a print material, printing setting data, or the like. Content data of a print material is data prepared by converting data created in an application by the user into an intermediate code. Printing setting data is data which describes how to output content data (output format or the like). In addition, the document file 303 contains application expansion data called an editing information file for providing a user interface in causing the user to edit the contents of a document file or issue an output instruction via a printing control application.

The document file 303 is loaded to the printing control application 304. The printing control application 304 can change, display, save, and print the output format of the loaded document file 303. Printing processing is actually executed by the printing application (despooler) 305. The printing application (despooler) 305 which has received a printing command from the printing control application 304 inputs data to the graphic engine 202 in a predetermined format such as a GDI function in accordance with the output format set by the printing control application 304. The graphic engine 202 converts the input data of the GDI function format into a DDI function, and outputs the DDI function to the printer driver 203. The printer driver 203 generates a printer control command in the page description language or the like on the basis of the DDI function acquired from the graphic engine 202, and outputs the command to the printer 500 via the system spooler 204.

<Data Format of Permanent File>

Before a detailed description of the printing control application 304, the data format of the document file will be described. The document file contains data of each original page (data of each page generated by an application: to be also referred to as a logical page) as content data, and data of a job ticket format as printing setting data. An editing information file for changing setting of printing setting information contained in the document file is also stored by a printing control application (to be described later) together with the document file. In the document file, original page data of the PDF format and data of the job ticket format are intermediate data.

In the document file, original page data is defined by the PDF format or the like, and contains designation of the character font and color, and layout information of characters, figures, and the like within an original page.

The job ticket serving as a document file is data having a structure whose minimum unit is an original page. The structure of the job ticket defines the layout of an original page on a paper sheet. One job ticket corresponds to one printing job. The node of the whole document is set at the top of the structure, and defines the attribute of the whole document such as double-sided printing/single-sided printing. This node is accompanied with a document structure and information representing setting of each building component. More specifically, a sheet bundle node belongs to the document node, and contains attributes such as the identifier of paper for use and designation of a feed port in the printer. The node of a sheet contained in the sheet bundle belongs to each sheet bundle node. One sheet corresponds to one paper sheet. A printing page (physical page) belongs to each sheet. One physical page belongs to one sheet in single-sided printing, and two physical pages belong to one sheet in double-sided printing. An original page to be laid out on a physical page belongs to the physical page. The physical page attribute contains an original page layout. An original page contains association information (link information) to original page data which is the entity of the original page.

Settings of the whole document include pieces of following information.

(1) Layout information (e.g., so-called N-up printing setting of laying out N pages on one physical page) and order of original pages on a physical page (sheet surface of a printing medium)
(2) Document name
(3) Double-sided designation or not
(4) Variable printing (technique of embedding separately prepared data in the contents of a predetermined column and printing the resultant data) or not
(5) The number of contained original pages
(6) Color type
(7) The number of copies, etc.
(8) Watermark (ground pattern superposed on an original page or printing page)
(9) Printer state
(10) Medium type
(11) Logical page number list on a sheet
(12) Printing quality, etc.

As for printing settings of each sheet bundle, the following parameters can be set.

(13) Designation of N-up printing
(14) Color type
(15) Paper feed source

As for printing settings of each sheet belonging to each sheet bundle, the following parameter can be set.

(16) Setting of double-sided/single-sided printing

As for printing settings of each physical page (plane) belonging to each sheet, the following parameters can be set.

(17) Color type
(18) Designation of an upper or lower surface

As for printing settings of each original page laid out on each physical page, the following parameters can be set.

(19) Start coordinates
(20) Size
(21) Order

In this manner, the job ticket is data having a hierarchical structure whose minimum unit is an original page. Most of printing settings defined by the job ticket are common on each layer set for each document, but some printing settings such as N-up setting and color type are common between layers. In principle, as for a common setting, a lower layer inherits the same setting value as that of an upper layer. When an attribute common between layers has different values, a value set for a layer of interest is used as the value of the attribute. For example, the color type can be set for a whole document, sheet bundle (set of sheets), and physical page (to be also referred to as a plane or printing page). The color type is a setting which designates a mode in the printing apparatus. Printing data is generated such that, if the monochrome mode is set, the printing apparatus prints in monochrome; if the color mode is set, prints in color.

<Document Structure Managed by Editing Information File>

The printing control application 304 is a program which provides a user interface for causing the user to designate data contained in a document file by various methods and change printing settings. The document file is a file having the above-described structure. The printing control application 304 manages the above-mentioned editing information file in correspondence with the document file in order to manage the document file. Based on editing information contained in the editing information file, the printing control application 304 manages a document with a management structure independent of a document defined by, e.g., a job ticket. The management structure is a hierarchical structure similar to the job ticket, but is formed by layers "book", "chapter", and "original (logical) page" from the top, unlike the job ticket. Of these layers, the original page corresponds to the original page of the job ticket. The chapter corresponds to the sheet bundle (set of sheets).

A virtual file displayed as a user interface is not a file which is permanently saved and managed, unlike the document file 303, but is temporarily created for a user interface when the user changes the printing settings of the document file or designates printing by using the printing control application 304. The printing control application 304 opens the document file 303 together with a corresponding editing information file 306, creates a virtual book file having a structure defined by editing information from the document file, and displays the book file as a user interface. When the user changes printing settings while referring to the book file via the user interface, the settings are reflected in the editing information file.

A book file temporarily created by the printing control application, i.e., a data format defined by the editing information file will be explained.

The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each original page (i.e., logical page) defined by an application program. As for each original page, its attributes can be defined. One book may include a plurality of chapters, and one chapter may include a plurality of original pages. In the following description, an original page will be simply called a page.

Figure 16A:
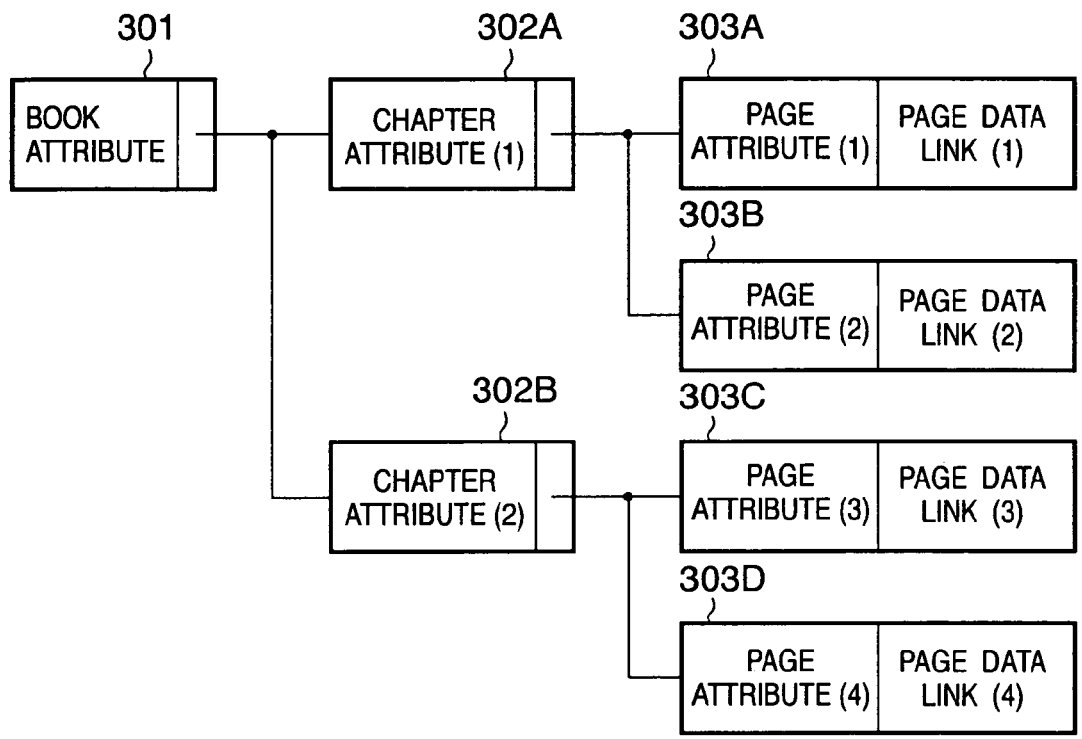
FIGS. 16A and 16B are block diagrams showing an example of a book file structure.

FIG. 16A is a block diagram schematically showing an example of the book file format defined by the editing information file. In other words, FIG. 16A is a block diagram schematically showing the contents of editing information data. In the editing information file of this example, a book, chapter, and page are represented by corresponding nodes. One editing information file includes one book. The book and chapter are a concept for defining a book structure, and contain, as entities, defined attribute values and links to lower layers. The page has, as an entity, data of each page output from an application program that creates printing data. The page entity is original page data of the PDF format or the like that is contained in the document file 303. That is, the editing information file only defines the book file format and attributes, and does not contain original page data itself.

Figure 16B:
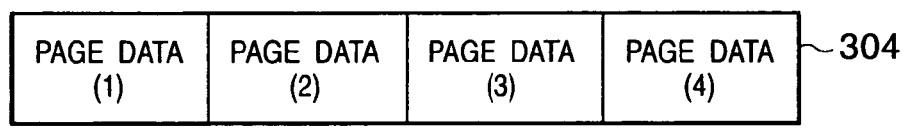

In FIG. 16A, a book 301 defines a book attribute, and is linked to two chapters 302A and 302B. These links display that the chapters 302A and 302B are included in the book 301. The chapter 302A is linked to original pages 303A and 303B, which represents that these original pages are included in the chapter 302A. The original pages 303A and 303B define attribute values, and contain links to original page data (1) and (2) serving as entities. These links correspond to data (1) and (2) of original page data 304 contained in the document file 303 shown in FIG. 16B, and display that the entities of the pages 303A and 303B are original page data (1) and (2).

FIGS. 17A and 17B show a list of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 17A and 17B does not correspond to one concrete item, but may contain a plurality of relevant items.

FIG. 18 shows a list of chapter attributes, and FIG. 19 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As the printing method setting, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As the detailed bookbinding setting, the opening direction and the number of paper sheets to be bundled can be designated when bookbinding printing is designated. The front/back cover setting includes designation of adding paper sheets serving as front and back covers when original page data combined as a book are printed. The index sheet setting and slip sheet setting are settings for inserting an index sheet and slip sheet in a printing apparatus for chaptering. The chaptering setting includes designation of whether to use a new paper sheet, use a new printing page, or do nothing particular at a chapter break.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and delivery method.

N-up printing designation is an item for designating the number of original pages included in one printing page. Layouts which can be designated are 1×1, 1×2, 2×2, 3×3, 4×4, and the like. The delivery method attribute is an item for designating whether to staple discharged paper sheets. The effectiveness of this attribute depends on whether the printing apparatus has a stapling function.

Items unique to the page attribute are page rotation setting, zoom, layout designation, annotation, and page division. The page rotation setting is an item for designating the rotation angle when an original page is laid out on a printing page. The zoom setting is an item for designating the zoom ratio of an original page. The zoom ratio setting is designated on the basis of a virtual logical page region size=100%. The virtual logical page region is a region occupied by one original page when original pages are laid out in accordance with N-up designation or the like.

Attributes common to the book, chapter, and page are a watermark attribute, header/footer attribute, and color type. The watermark is a separately designated image or character string printed over data created by an application. The header and footer are watermarks printed at the upper and lower margins of each page. The color type is a setting which designates the mode of the printing apparatus. Printing data is generated such that, if the monochrome mode is set, the printing apparatus prints in monochrome; if the color mode is set, prints in color.

Each printing setting item also includes a flag representing "exceptional setting" when a chapter or original page has a setting different from that of a book (document).

<Generation Sequence of Editing Information File>

Figure 20:
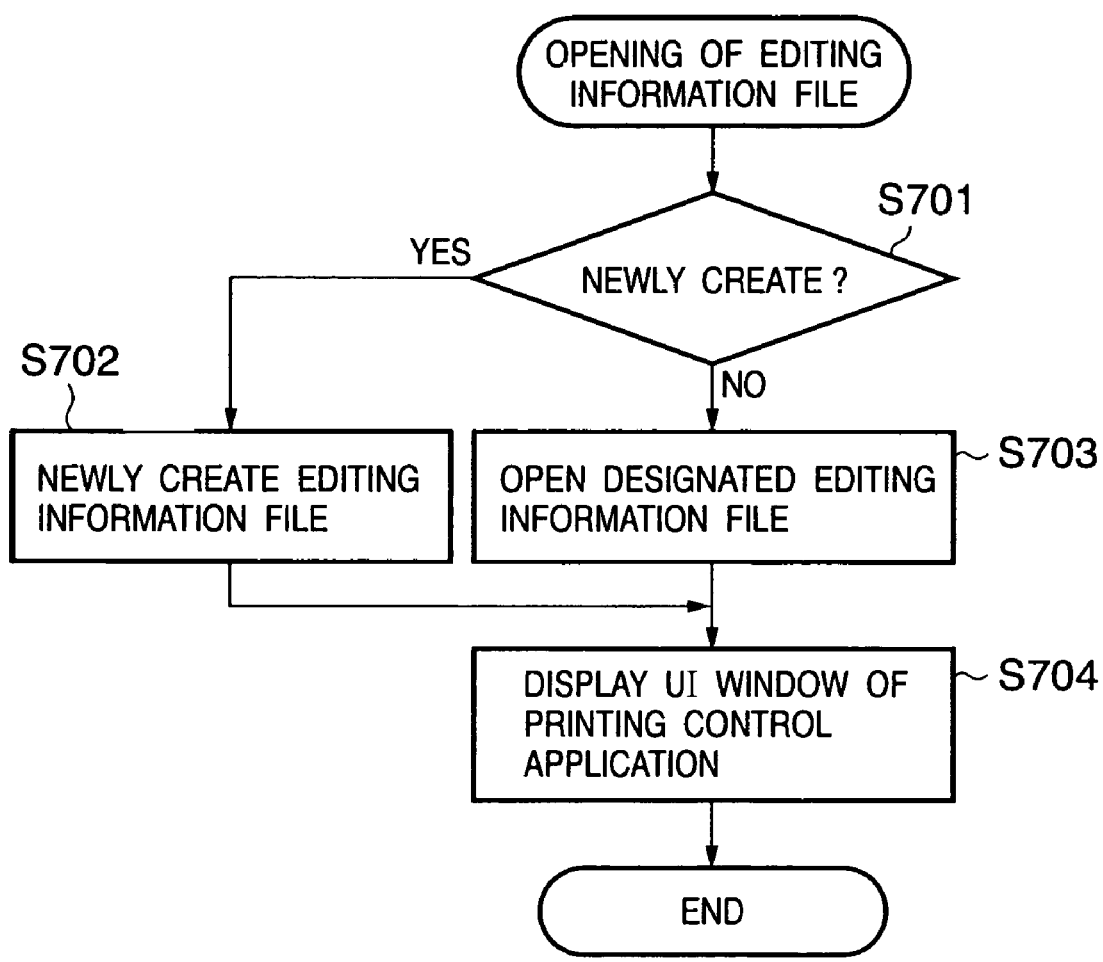
FIG. 20 is a flow chart showing a sequence of opening a book file.

The editing information file has the above-described structure and contents. A sequence of creating an editing information file by the printing control application 304 and printing data save driver 302 will be explained. Creation of an editing information file is realized as part of editing operation of an editing information file by the printing control application 304. FIG. 20 shows a sequence when the printing control application 304 opens an editing information file.

Whether an editing information file to be opened is one to be newly created or an existing one is determined (step S701). If YES in step S701, an editing information file including no chapter is newly created (step S702). In the example shown in FIG. 16A, the newly created editing information file is a book node which has only the book node 301 without any link to a chapter node. As the book attribute, a set of attributes prepared in advance for creation of a new editing information file are applied. A UI (User Interface) window for editing the new editing information file is displayed (step S704). In the UI window upon newly creating an editing information file, a UI window 1100 in FIG. 9 has no content.

Figure 9:
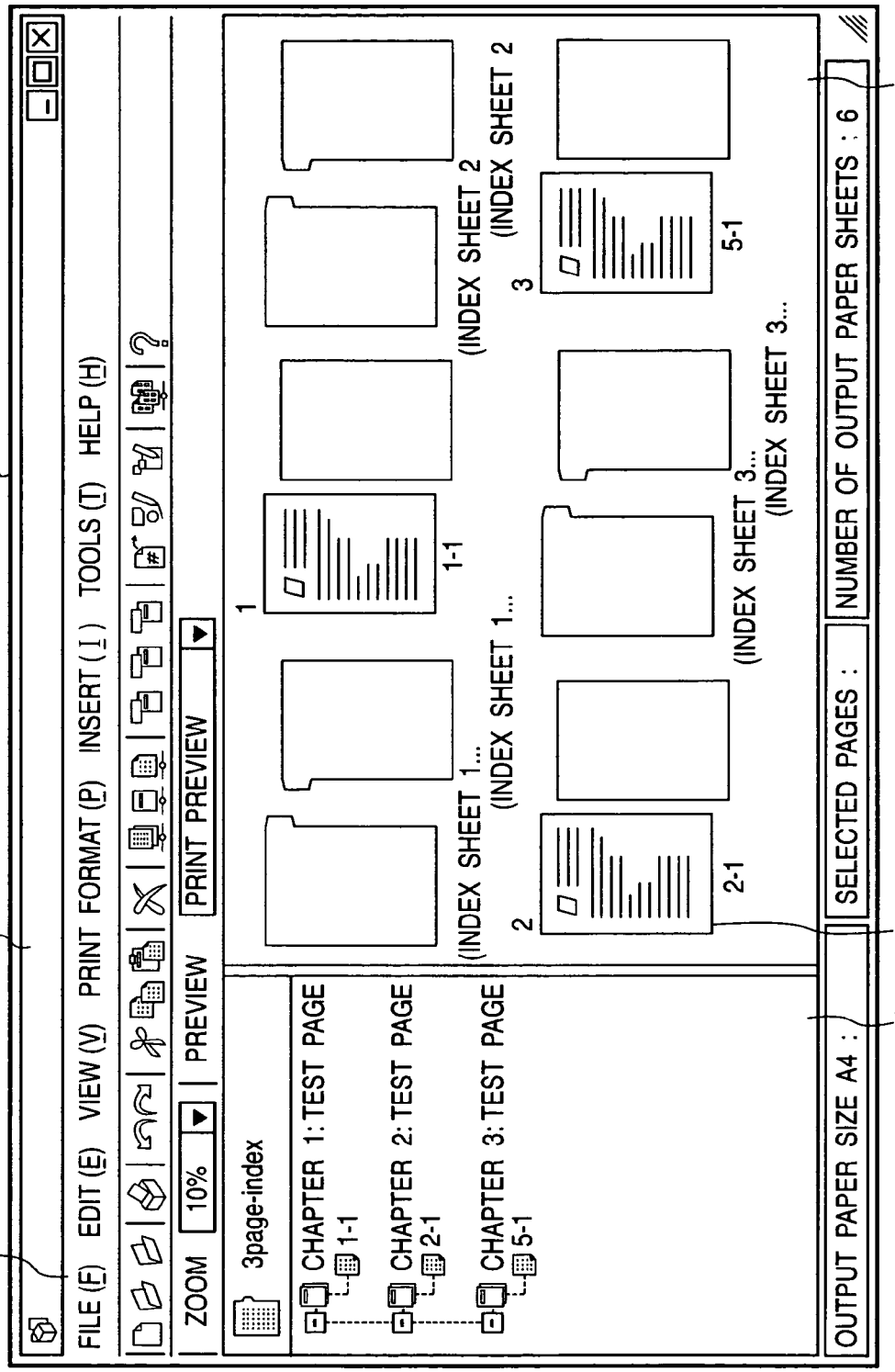
FIG. 9 is a view showing an example of a printing control application UI.

If NO in step S701, a designated editing information file is opened (step S704), and data are rasterized in accordance with the structure, attributes, and contents of the editing information file to display a UI (User Interface) window. Data mapped in the RAM 102 also takes the same structure as that in FIG. 16A. Attributes included in the node of each layer are also mapped in the RAM 102 in the format shown in FIGS. 17A to 19. For example, the structure of these attribute items can be realized with a pointer or the like, and each item at the attribute can be identified by the identifier of the item or the like. FIG. 9 shows an example of the UI window. The UI window 1100 has a tree portion 1101 representing a book structure, and a preview portion 1102 displaying a state to be printed. The tree portion 1101 displays chapters included in the book and pages included in each chapter by a tree structure as shown in FIG. 16A. Pages displayed at the tree portion 1101 are original pages. The preview portion 1102 displays reduced printing page contents. The display order reflects the book structure.

Figure 21:
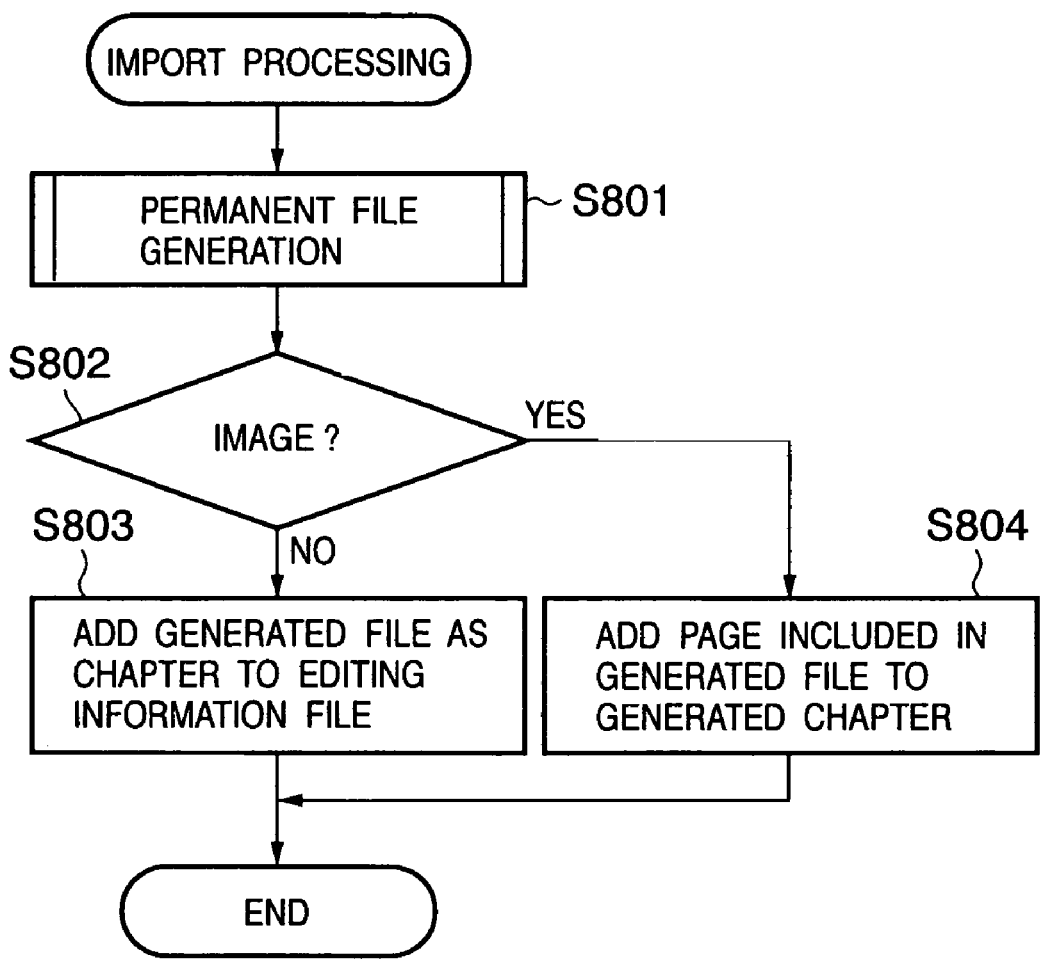
FIG. 21 is a flow chart showing a sequence of importing an electronic original file to a book file.

Original page data of an intermediate format can be added as a new chapter to the open editing information file by the printing data save driver 302. This function is called an import function. Application data is imported to the editing information file newly created by the sequence of FIG. 20, and the original page data is made to belong to the chapter of the editing information file, thereby giving an entity to the editing information file. This function is activated by drag-and-drop operation of application data to the window of FIG. 9. FIG. 21 shows an import processing sequence.

An application program which has generated designated application data is activated. The printing data save driver 302 is designated as a device driver, and application data is printed out to convert the data into data of an intermediate format (e.g., PDF format) (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data.

If NO in step S802, the intermediate data generated in step S801 is added as a new chapter to the book of a currently open editing information file (step S803). That is, a new chapter and new original pages belonging to this chapter are added by import. Link information to the entity of an original page is written at each page node. The entity of the original page is generated by the printing data save driver 302.

In import, as for chapter attributes which are common to book attributes, the values of the book attributes are copied. As for unique chapter attributes, predetermined values are set. Chapter attributes which are common to those of the whole document of the document file inherit the values of the attributes of the documents.

If YES in step S802, no new chapter is added in principle, and image data is added to a designated chapter by using one file as one original page (step S804). For an empty file in which an editing information file is newly created, a new chapter is created, and image data is added as an original page belonging to the chapter. As for the page attribute, attributes common to the attributes of an upper layer are given the attribute values of the upper layer, and attributes which are defined in application data and inherited to the document file are given values defined in the application data. For example, when N-up designation is defined in application data, the page inherits this attribute value. In this way, a new editing information file is created, or a new chapter is added.

As for a document file, added original page data is newly added and saved if data generated by the printing data save driver is an addition to an existing document file. At this time, if printing settings designated by an application are reflected in data generated by the printing data save driver, the printing settings can also be reflected in the document file.

Figure 22:
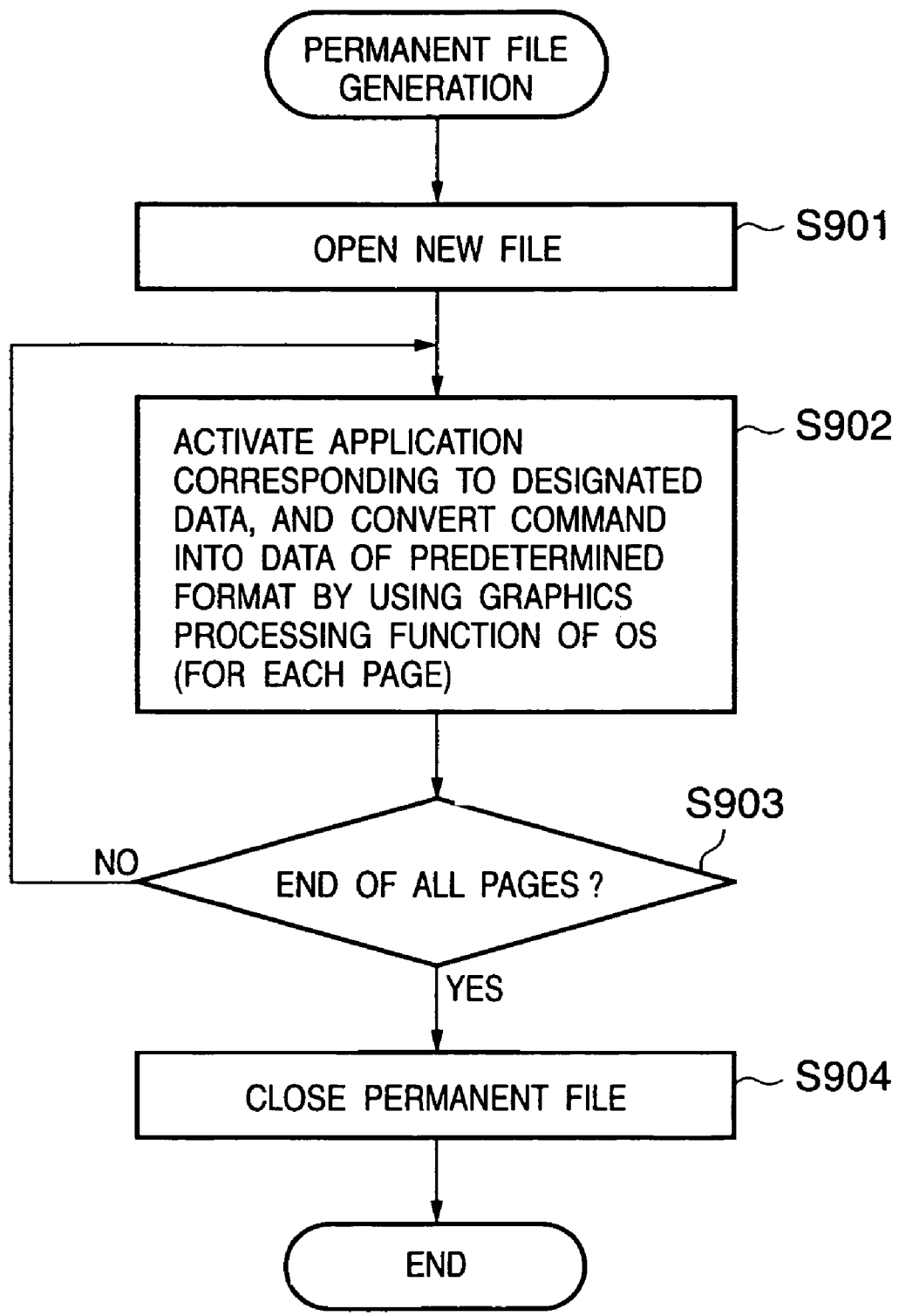
FIG. 22 is a flow chart showing a sequence of converting application data into an electronic original file.

FIG. 22 is a flow chart showing a sequence of generating a document file by the printing data save driver 302 in step S801 of FIG. 21. A new document file is created and opened (step S901). An application corresponding to designated application data is activated. The printing data save driver 302 is set as a device driver to transmit an output command to an OS output module (e.g., Windows GDI). The output module converts the received output command into data of a predetermined format (e.g., PDF format) by the printing data save driver 302, and outputs the converted data (step S902). The output destination is the document file opened in step S901. Whether all designated data have been converted is determined (step S903), and if YES in step S903, the document file is closed (step S904). The document file generated by the printing data save driver 302 is a file which contains a structure shown in FIG. 16A and original page data entities shown in FIG. 16B.

<Editing of Editing Information File>

As described above, an editing information file can be created from application data. The chapter and page of the generated editing information file can be edited as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page
(13) Color mode setting The color mode setting can also be changed for a book. In addition, an operation of canceling executed editing operation, and an operation of restoring canceled operation can be performed. These editing functions enable editing operations such as consolidation of a plurality of editing information files, rearrangement of chapters and pages within an editing information file, delete of chapters and pages within an editing information file, layout change of an original page, and insertion of a slip sheet and index sheet. By these operations, operation results are reflected in attributes shown in FIGS. 4 to 6 or on an editing information file structure. For example, a blank page is inserted into a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering.

<Output of Editing Information File>

The ultimate goal of an editing information file created and edited in the above manner is to print it out. If the user selects a file menu from the UI window 1100 of the printing control application shown in FIG. 9 and selects printing from this menu, the editing information file is then printed out by a designated output device. At this time, the printing control application 304 creates a despool table from a currently open editing information file and corresponding document file (e.g., job ticket), and transfers the despool table to the despooler 305. This sequence will be described in detail. The despooler 305 converts the document file into an OS output command, e.g., a Windows GDI command, and transmits the command to a GDI serving as a graphic engine. The graphic engine 202 generates a command complying with a device by a designated printer driver 203, and transmits the command to the device.

<Processing Sequence by Printing Control Application>

FIGS. 5 to 15 are flow charts showing processing sequences in the printing control application 304 and printing application (despooler) 305 which are features of the image processing system according to the present invention. A processing flow by the host computer of the image processing system will be explained with reference to FIGS. 5 to 15.

Figure 5:
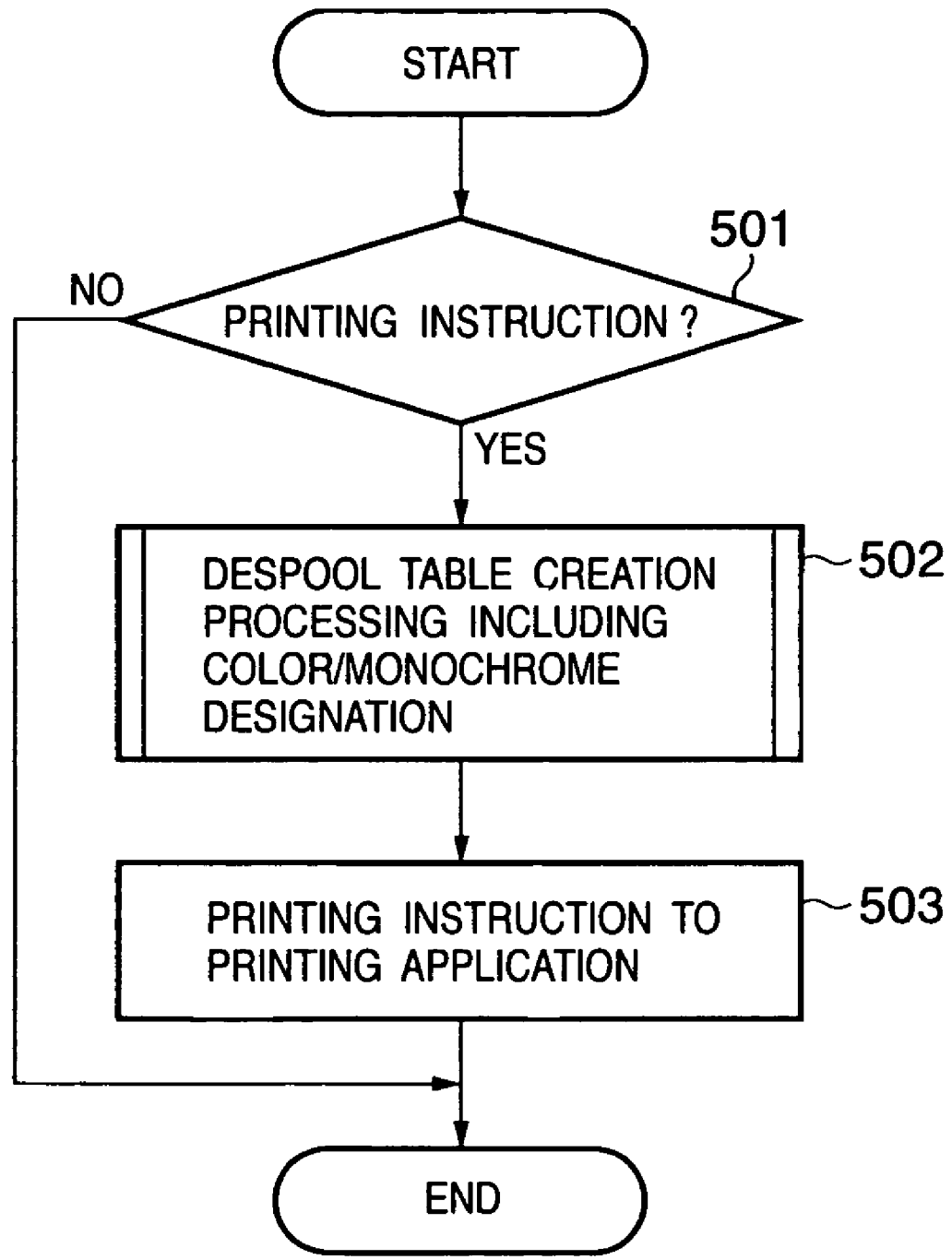
FIG. 5 is a flow chart showing processing in a printing control application.
Figure 6:
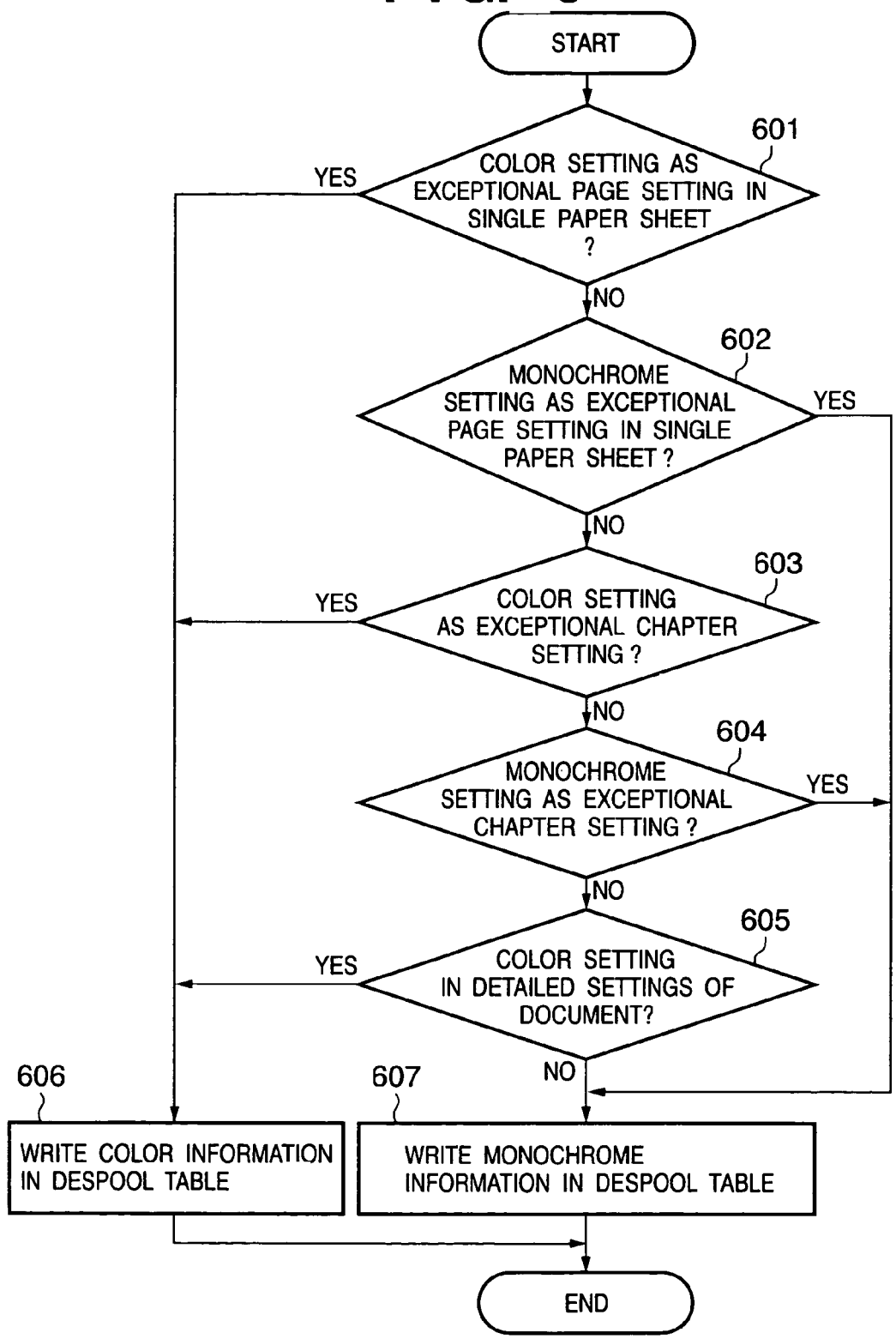
FIG. 6 is a flow chart showing another processing in the printing control application.
Figure 7:
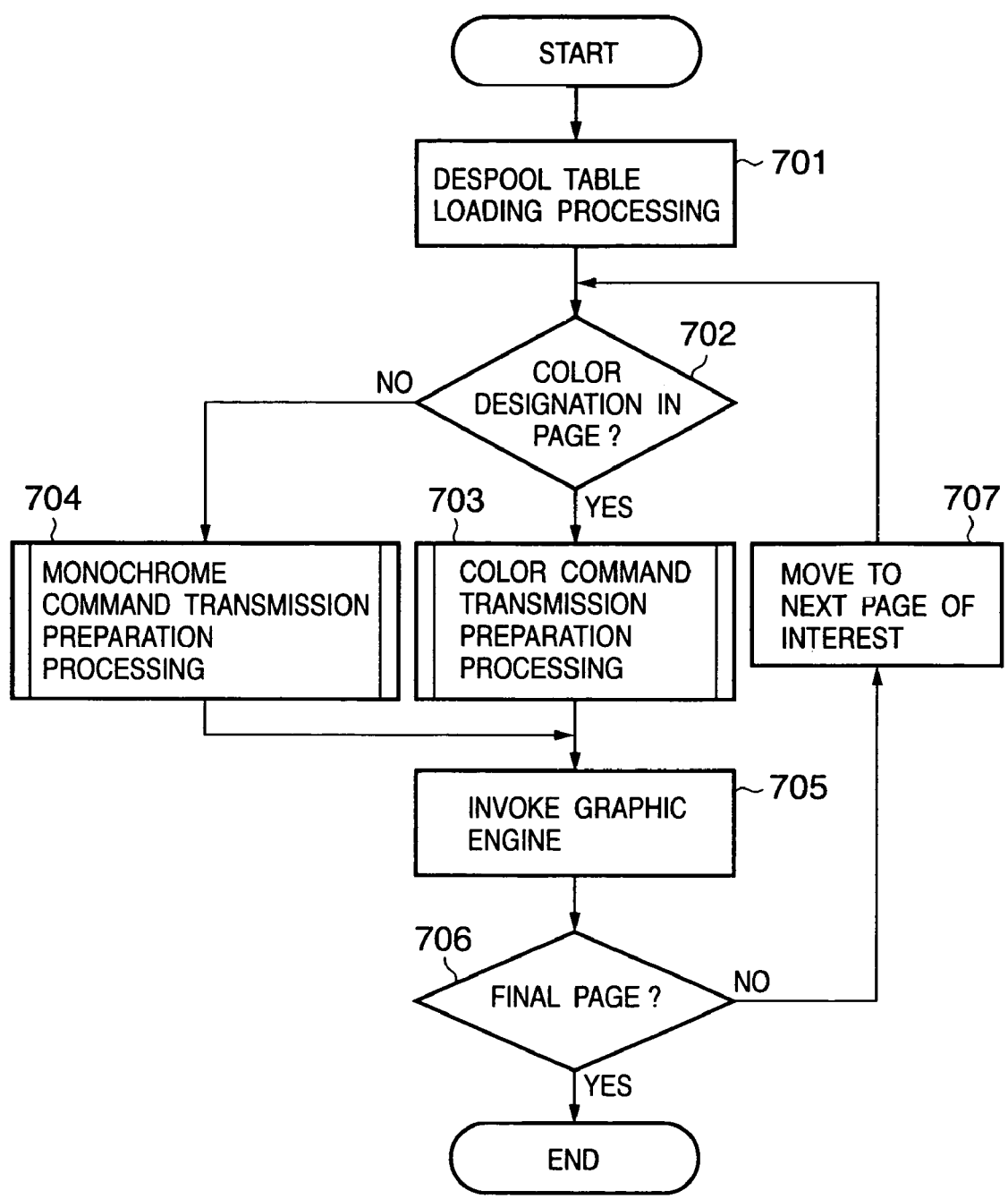
FIG. 7 is a flow chart showing processing in a printing application.
Figure 8:
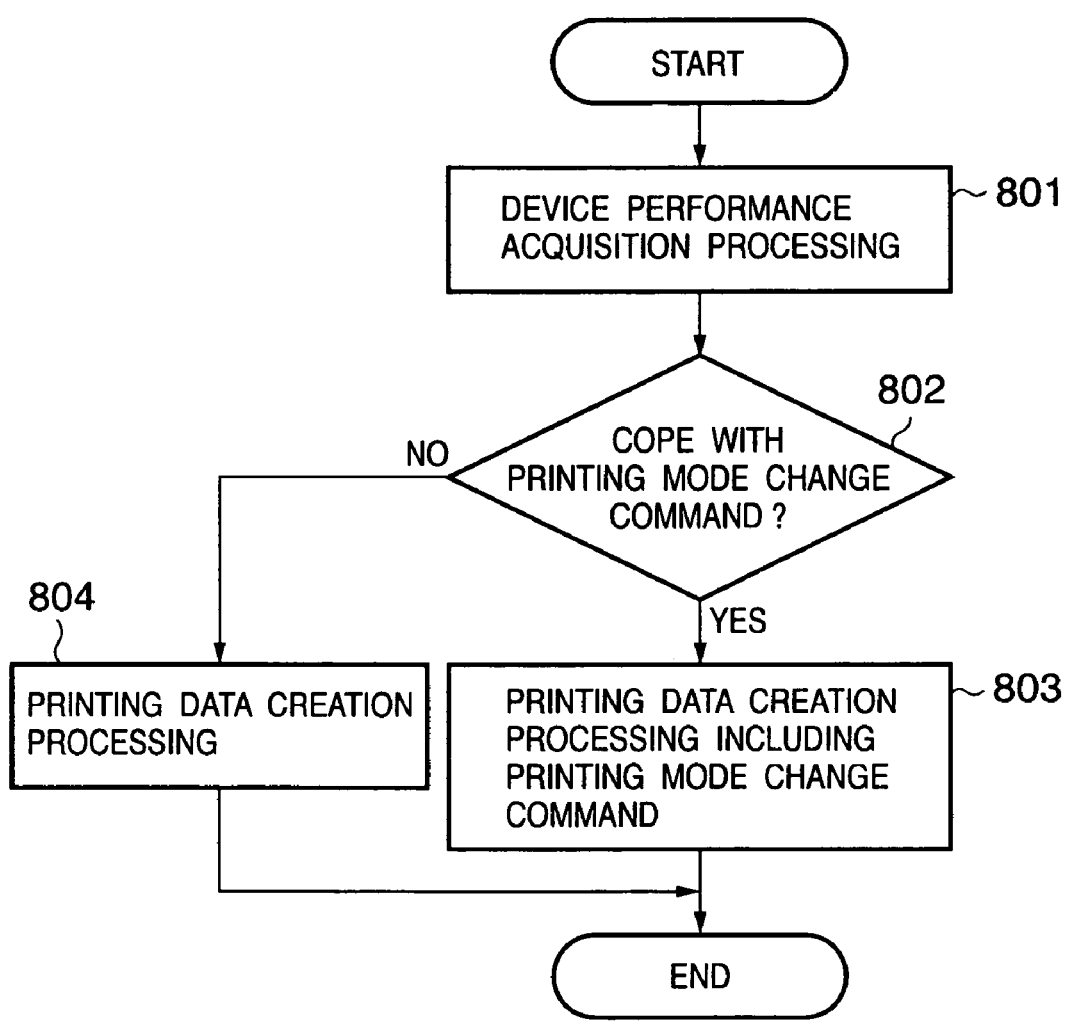
FIG. 8 is a flow chart showing another processing in the printing application.

FIGS. 5 and 6 show the outline of the flow of the printing control application 304, and FIGS. 7 and 8 show the outline of the flow of the printing application 305. FIG. 9 shows an example of a user interface window when the printing control application 304 opens a book file. FIGS. 10 to 13 show examples of user interfaces which prompt operation such as a printing instruction on the window. In FIG. 9, index sheets are inserted between chapters by an editing information file, and displayed in a reduced size.

The printing control application 304 can newly create an editing information file in the above-described fashion, or designate and open an existing editing information file. An editing information file mapped in the memory will be called editing information data. In mapping, the window in FIG. 9 is displayed on the basis of the editing information file and document file.

Figure 11:
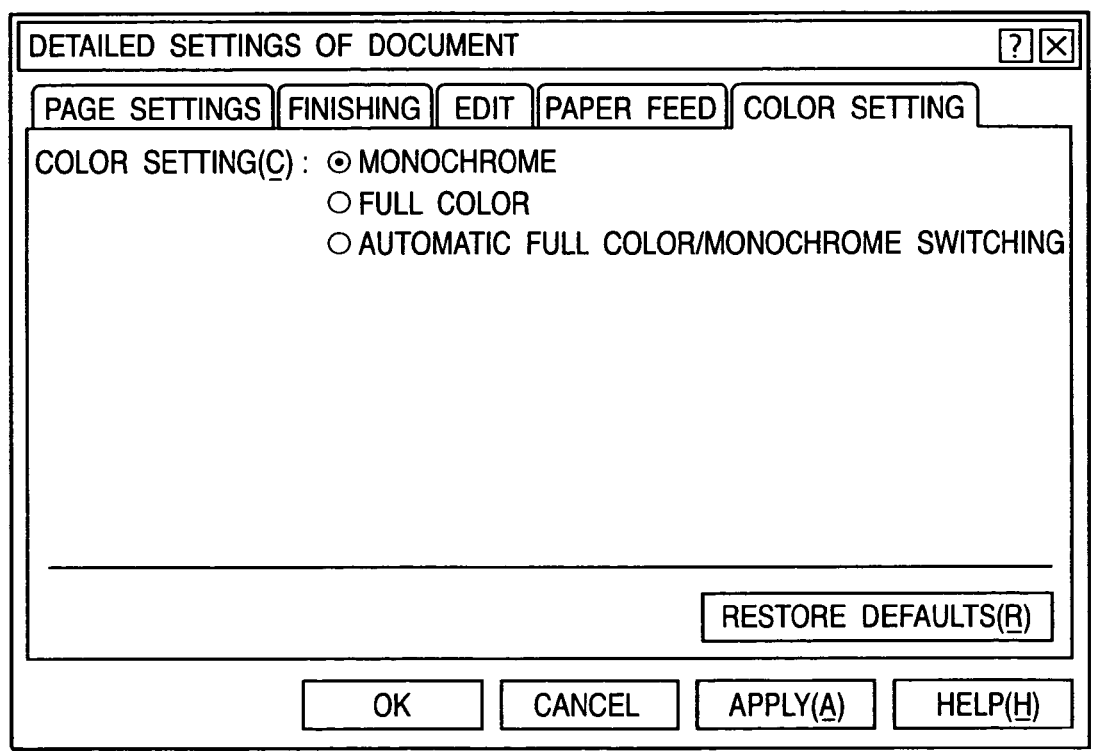
FIG. 11 is a view showing still another example of the printing control application UI.
Figure 12:
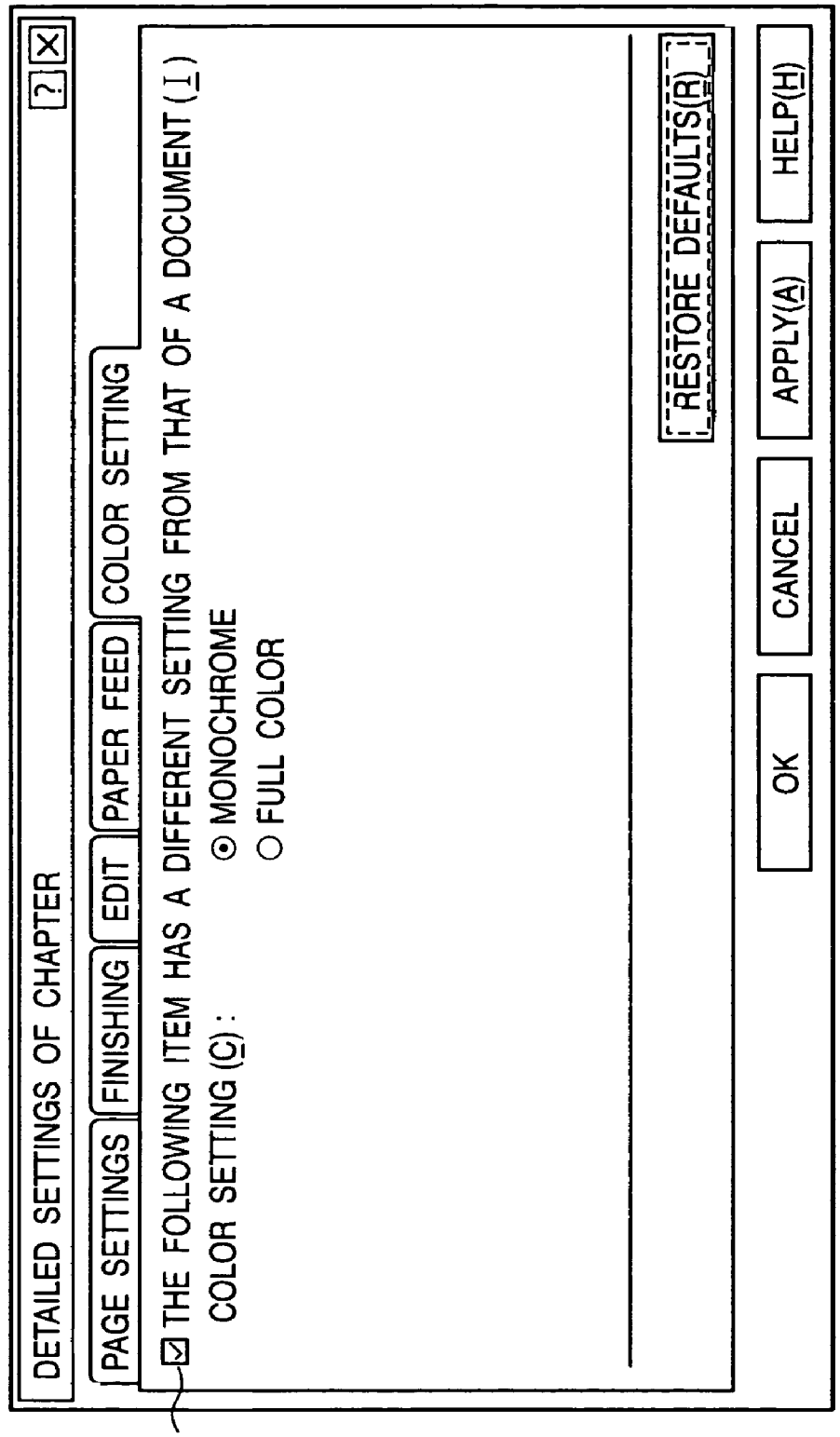
FIG. 12 is a view showing still another example of the printing control application UI.
Figure 13:
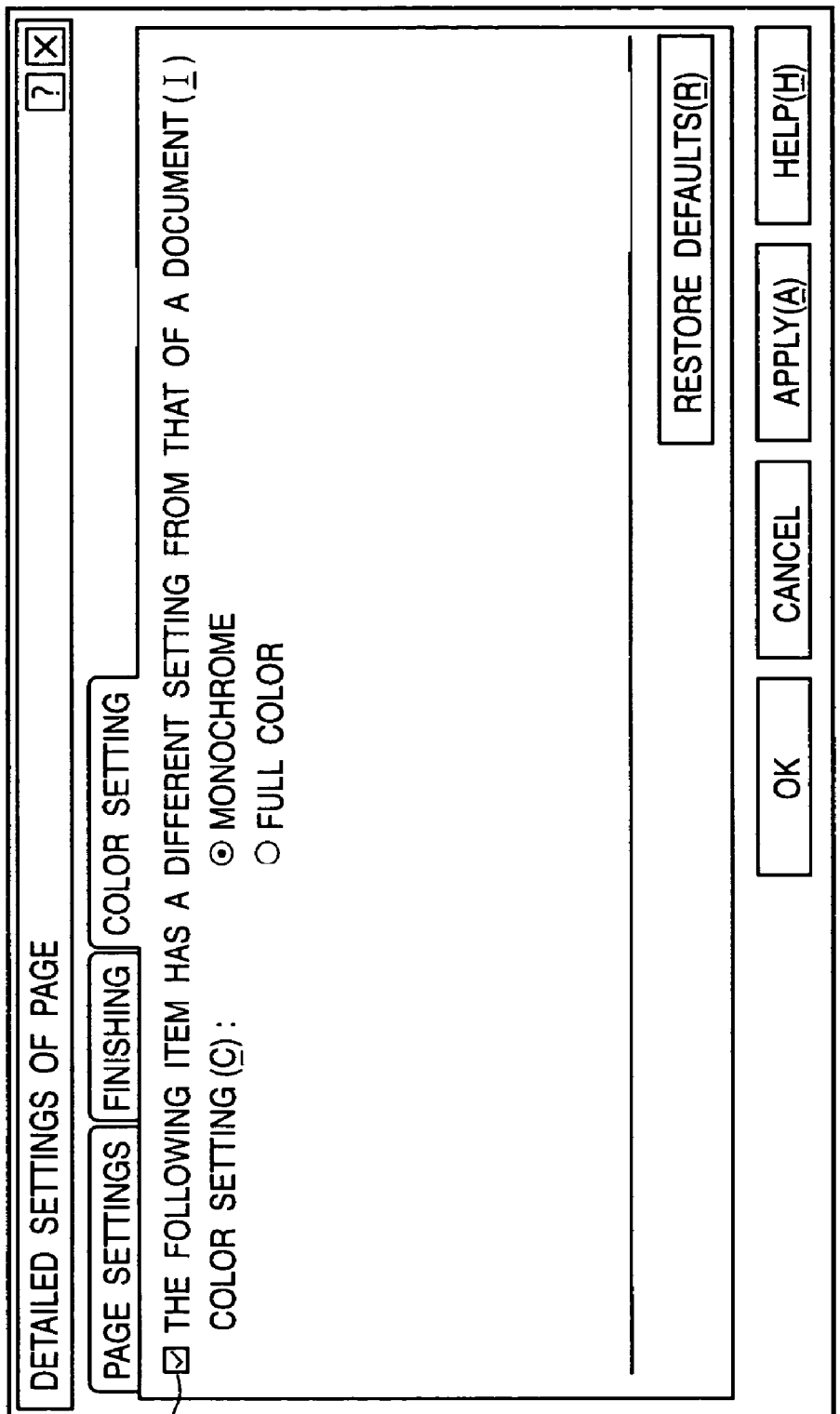
FIG. 13 is a view showing still another example of the printing control application UI.

In FIG. 9, if the user selects a "print format" column 1111, a popup menu including columns "detailed settings of document", "detailed settings of chapter",and "detailed settings of page" is displayed. In these columns, the attributes of a whole document, chapter, and original page can be set. FIGS. 11 to 13 show user interface windows displayed when "detailed settings of document", "detailed settings of chapter", and "detailed settings of page" are designated from the popup menu. Exceptional setting check boxes 1201 and 1301 for defining settings different from those of a document are prepared for a chapter and original page. When the check box is checked, monochrome/color setting can be selected as an exceptional setting. If the user checks the exceptional setting check box, a flag representing "exceptional setting" is set and stored as part of editing information data. If the exceptional setting is checked, a full-color/monochrome radio button can be designated. As for a whole document (book), automatic full-color/monochrome switching can be selected (see FIG. 11). If the user designates the exceptional setting check box and radio button of full color or monochrome, a value corresponding to the exceptional setting flag and designated button is set as data of the editing information file mapped in the RAM 102, i.e., as the value of the "color type" item for the book attribute (FIGS. 17A and 17B), chapter attribute (FIG. 18), and page attribute (FIG. 19) in FIG. 16A.

The user can designate color/monochrome setting on the user interface window of FIG. 9 for each book, chapter, or page.

If a "file" column 1112 in FIG. 9 is selected, a popup menu including a "print" column is displayed. If "print" is designated, the window in FIG. 10 is displayed. If an OK button 1001 is clicked in FIG. 10, this signal is sent as a printing instruction to start outputting printing data.

FIG. 5 shows a sequence executed by the printing control application 304. In practice, processing corresponding to instruction contents is performed subsequent to analysis of the instruction contents of an input from the user. In FIG. 5, analysis of instruction contents is limited to a printing instruction for descriptive convenience.

Figure 14:
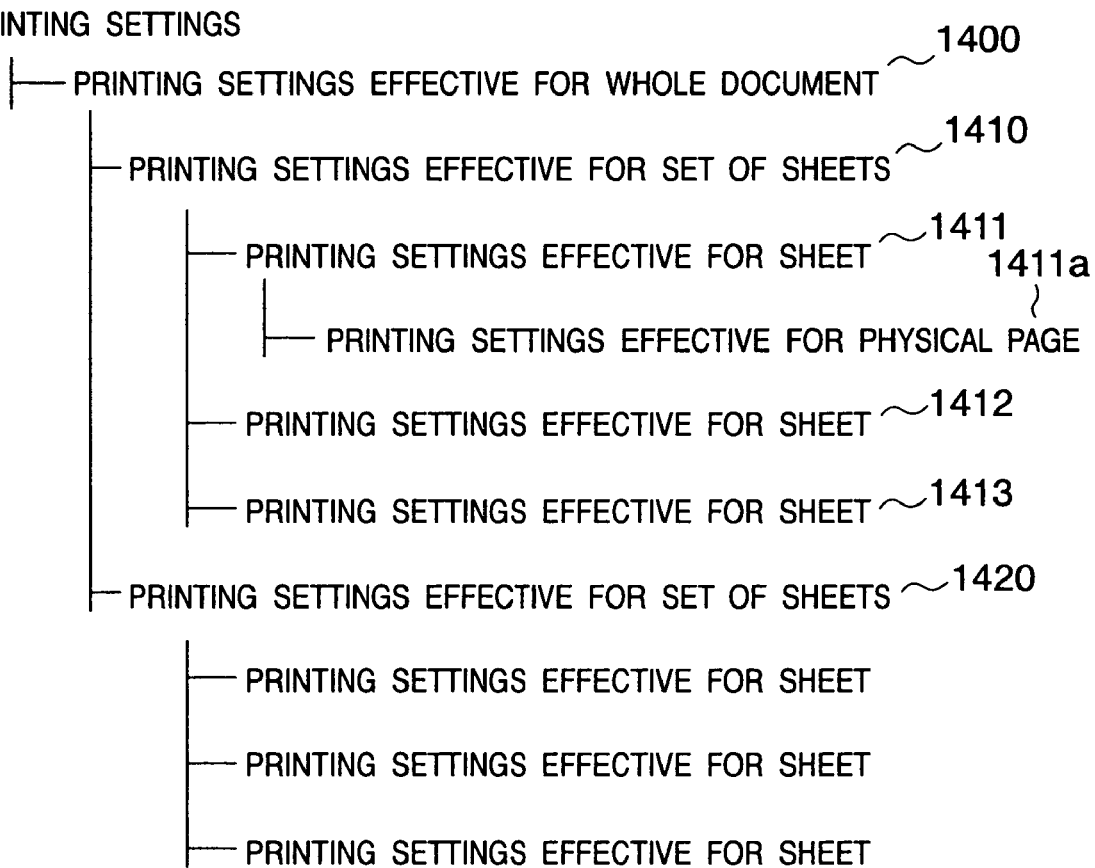
FIG. 14 is a view showing the outline of a despool table.

In FIG. 5, if the user inputs an instruction through any UI, determination processing of whether the instruction is a printing instruction is performed in step 501. Assume that the user inputs a printing instruction through the UIs shown in FIGS. 9 and 10. Despool table creation processing 502 including color/monochrome designation (color type) is then executed. The despool table has a structure as shown in FIG. 14, and is a table which designates printing information to the printing application. In step 502, a despool table including color/monochrome designation is created.

FIG. 14 shows an example of a despool table created on the basis of a document file. The despool table is mapped in the RAM 102. In the first embodiment, the document file contains printing setting data "job ticket". The despool table contains the same structure as that of the job ticket, printing settings in respective layers, and association with original pages. More specifically, a printing setting 1400 such as the number of copies or color type which is effective for a whole document is followed by printing settings 1410 and 1420 such as N-up printing designation and color type which are effective for sheet bundles (sets of sheets). Sheets belonging to each sheet bundle have printing settings 1411, 1412, and 1413 such as double-sided/single-sided printing. Each physical page (plane) belonging to each sheet has a printing setting 1411*a* such as the color type or designation of a front/back cover. Although details are not shown in FIG. 14, the printing settings of each layer include a settable item. The settings in the despool table are designated on a physical page in accordance with the device specifications.

In step 503, printing instruction processing to the printing application (despooler) 305 is done. In this processing, the printing application (despooler) is instructed to print in accordance with the contents of the despool table. The printing control application 304 transfers to the printing application 305 original page data to be printed and data which specifies a physical page for specifying a plane subjected to printing, and causes the printing application 305 to convert the data into the parameter of the GDI function.

In processing of step 502, a despool table is created, and color/monochrome information is written as the item value of the color type in accordance with designation through the UI windows in FIGS. 11 to 13. FIG. 6 shows a processing sequence of mapping a despool table and then setting again the color type as one of printing settings on the basis of designation in the printing control application 304.

In FIG. 6, editing information data set through the UI is referred to. Determination processing 601 of checking the attribute of the original-page node of the editing information data, and determining whether color setting has been done as an exceptional page setting within each sheet (paper sheet) and a logical page is included is executed. The printing control application can perform color setting of each page as an exceptional setting in detailed settings of a page through the UI shown in FIG. 13. In step 601, a page having color setting as an exceptional setting of a logical page is determined. This setting is a setting to a logical page, and the settings in the despool table are designated on a physical page in accordance with the device specifications. Even if a given logical page has monochrome designation, whether another logical page included in the same physical page as that of the target logical page has full-color setting as an exceptional setting must be determined. In double-sided printing, whether a back surface has full-color setting is determined. After that, whether the paper sheet has full-color setting as an exceptional page setting can be determined. The correspondence between a logical page and a sheet on which the logical page is laid out can be determined by looking up the despool table or job ticket. If the full color has been set as an exceptional page setting in step 601, the processing branches to step 606. In step 606, "full color" is written as the color type of the printing setting in the despool table for respective sheets which include all logical pages having full-color setting as an exceptional page setting.

If NO in step 601, determination processing 602 of whether the target paper sheet has monochrome setting as an exceptional page setting is executed. Similar to step 601, whether exceptional monochrome setting has been done is determined. If YES in step 602, write processing 607 of monochrome information in the despool table is executed without performing subsequent determination processing. In step 607, "monochrome" is written as the color type in the despool table for respective sheets which include all logical pages having this exceptional page setting.

If NO in step 602, determination processing 603 of whether color setting has been done as an exceptional chapter setting is executed. Similar to an original page, the printing control application can perform color setting of each chapter in detailed settings of a chapter through the UI shown in FIG. 12. Color setting is determined even if no color setting is determined in determination processing 601 of whether color setting has been done as an exceptional page setting within a paper sheet, but no monochrome setting has been done as an exceptional page setting, and color setting has been done in chapter setting. If full-color setting has been done as an exceptional chapter setting, the processing branches to step 606. In step 606, "full color" is written as the color type of the printing setting in the despool table for respective sheet bundles (sets of sheets) corresponding to all chapters having full-color setting as an exceptional chapter setting.

If NO in step 603, determination processing 604 of whether monochrome setting has been done as an exceptional chapter setting is executed. Whether the chapter has exceptional monochrome setting is similarly determined. If YES in step 604, write processing 607 of monochrome information in the despool table is executed without performing subsequent determination processing. In step 607, "monochrome" is written as the color type of the printing setting in the despool table for respective sheet bundles (sets of sheets) corresponding to all chapters having the exceptional chapter setting "monochrome".

If NO in step 605, determination processing of whether color setting has been done in detailed settings of a document is executed. If no exceptional setting of a page or chapter exists, color/monochrome setting is written for the first time in accordance with detailed settings of a document. This is achieved by write processing 606 of color information in the despool table or write processing 607 of monochrome information in the despool table. In this case, the color type in the printing settings of the document is written.

Figure 15:
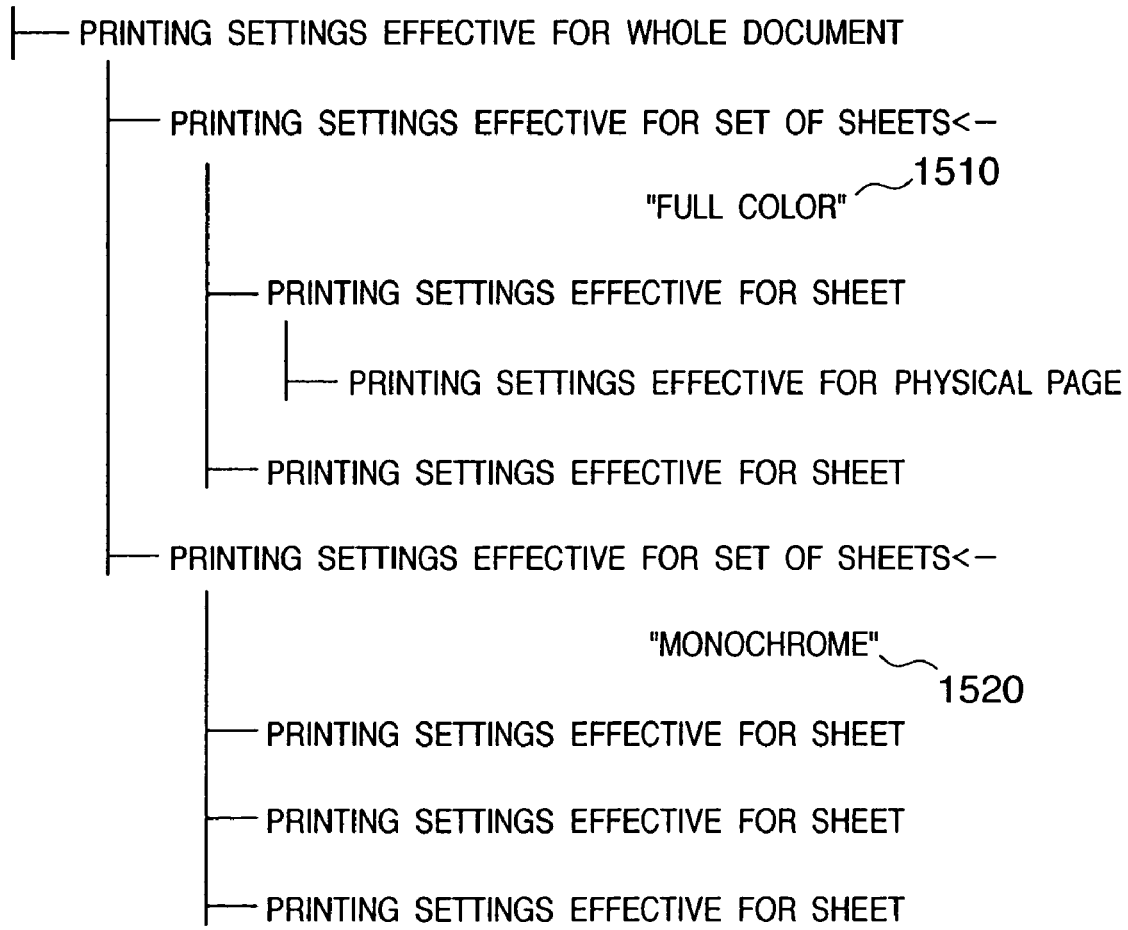
FIG. 15 is a view showing the outline of another despool table.

FIG. 15 is a view showing an example of the despool table in which printing settings for a sheet bundle (sets of sheets) is written. In FIG. 15, setting values "full color" 1510 and "monochrome" 1520 are written as printing settings effective for respective sheet bundles. In FIG. 15, setting values other than the color type are omitted.

The despool table created by the above sequence is transferred to the printing application together with data of each original page and designation of a printing range.

<Processing Sequence by Printing Application>

An operation when the printing application (despooler) 305 receives printing instruction processing from the printing control application will be explained.

Despool table loading processing 701 is performed. In this processing, the despool table created by the sequences of FIGS. 5 and 6 is loaded to the printing application (despooler) 305. Printing settings effective for a whole document, printing settings effective for a set of sheets, printing settings effective for a sheet, and printing settings effective for a physical page are sequentially loaded. After loading, these printing settings are held, and attention is sequentially given to physical pages (printing pages) represented by the despool table to perform processes in step 702 and subsequent steps. Together with the despool table, the printing application 305 receives information for specifying physical pages in the printing range from the printing control application. This information is obtained by converting pages designated by the user via the user interface of the printing control application 304 into physical pages. Pages can be easily converted from correspondence between sheet bundles, sheets, physical pages, chapters, and logical pages.

In FIG. 15, a color/monochrome printing instruction (color type) is included in loaded printing settings effective for a set of sheets. In determination processing 702, a color type set for a whole document, each set of sheets, or each physical page is determined for a physical page of interest. In step 702, if the physical page of interest is determined to have a full-color instruction, the next color command transmission preparation processing 703 is executed. A full-color instruction to the physical page of interest means that the physical page of interest has full-dolor setting, or a sheet bundle including the physical page of interest or the whole document has full-color setting. If the physical page of interest does not have any color instruction, the processing branches to step 704.

Color command transmission preparation processing 703 is performed prior to subsequent printing mode command transmission processing 705. Processing 703 is executed by a sequence shown in FIG. 8. Monochrome command transmission preparation processing 704 is also performed prior to subsequent printing mode command transmission processing 705. Processing 704 is also executed by the sequence shown in FIG. 8.

In FIG. 8, performance acquisition processing 801 of acquiring performance information of a device, e.g., printer is performed. Since the device may not cope with a change of the printing mode, the device is inquired whether it copes with printing mode change processing. That is, the printer is inquired whether it can process in one job a printing mode change command for changing the printing mode. This also applies to a device which cannot print in color. Processing 801 is executed through the printer driver. When the printer driver or OS holds device function information, this determination can also be achieved by referring to the function information.

After that, determination processing 802 of whether the device for use copes with the printing mode change command is executed by referring to the acquired performance information. If the device is determined in determination processing 802 to be able to cope with a change of the printing mode, a printing mode change command including a color command or monochrome command is created for the physical page of interest. If this processing is executed in step 703, data for creating a printing instruction including a printing mode change command (color command) which designates a change of the color mode to "full color" is created in step 803.

If the processing is executed in step 704, data for creating a printing instruction including a printing mode change command (monochrome command) which designates a change of the color mode to "monochrome" is created.

The printing instruction is a structure which is designated by the application to the device via the graphic engine and driver. This printing instruction also depends on the device, and is created by the graphic engine 202 via the driver 203. For this purpose, in steps 803 and 804, the printing application 305 creates data to be processed by the graphic engine 202. The created data is identical to data created by the application program which prints via the graphic engine. That is, the printing application has a data format in which a page designated as a printing target by the printing control application and the printing settings of the page are transferred to the graphic engine.

The processing returns to step 705 to invoke the graphic engine 202 to create a printing instruction.

The GDI serving as a Windows® graphic engine manages image information processing for a display card or printer. The GDI dynamically links a module called a device driver in order to absorb dependency of each device such as a display card or printer, and performs output processing to the device. A device driver for the printer is the printer driver 203. The printer driver 203 has a basic function group called DDI (Device Driver Interface) which is determined to be installed in the device driver in advance in accordance with the performance and function. The GDI converts an API (Application Programming Interface) call by the printing application into device driver data. The DDI function group is properly called by the GDI to generate the above-mentioned printing instruction, and this instruction is transmitted to the printer 500 via the system spooler 204. The GDI sequentially processes a printing request from the printing application 305 via the printer driver. When the printer 500 is equipped with a controller capable of processing a printing mode command called PDL (Printer Description Language), the printer driver 203 performs processing of replacing drawing information having a high degree of abstraction with the PDL. This printing mode command includes a color command or monochrome command.

In steps 803 and 804, processing of creating data to be processed by the graphic engine 202 is executed. In step 705, processing is achieved by the GDI.

Whether the page of interest is the final physical page to be printed is determined in step 706. If NO in step 706, the page of interest shifts to the next page (707), and the processing is repeated from step 701.

The printing mode command created by the graphic engine 202 and printer driver 203 is output from the printer driver 203, and temporarily held by the spooler 204. The printing mode command is then transmitted from the spooler 204 to the printer 500 asynchronously to printing mode command generation processing. In this processing, a printing instruction is transmitted to the device.

If a color command or monochrome command is transmitted, the printer 500 changes the color mode in accordance with the command, and performs actual image formation processing.

With this arrangement, the printing system according to the first embodiment can provide a mechanism capable of designating color printing or monochrome printing for a page desired by the user in a document of pages that is created by an application, and performing printing processing designated by the user.

More specifically, the printing control application performs an exceptional color/monochrome setting for each page or chapter. The color/monochrome printing mode in the printer can be switched for each page or chapter during one output operation.

A page to be printed in monochrome can be printed in monochrome, saving the expandable and charging of the page. Further, arrangement of printouts or the like can also be achieved using an optional function of the printer.

<Printer Arrangement>

Figure 4:
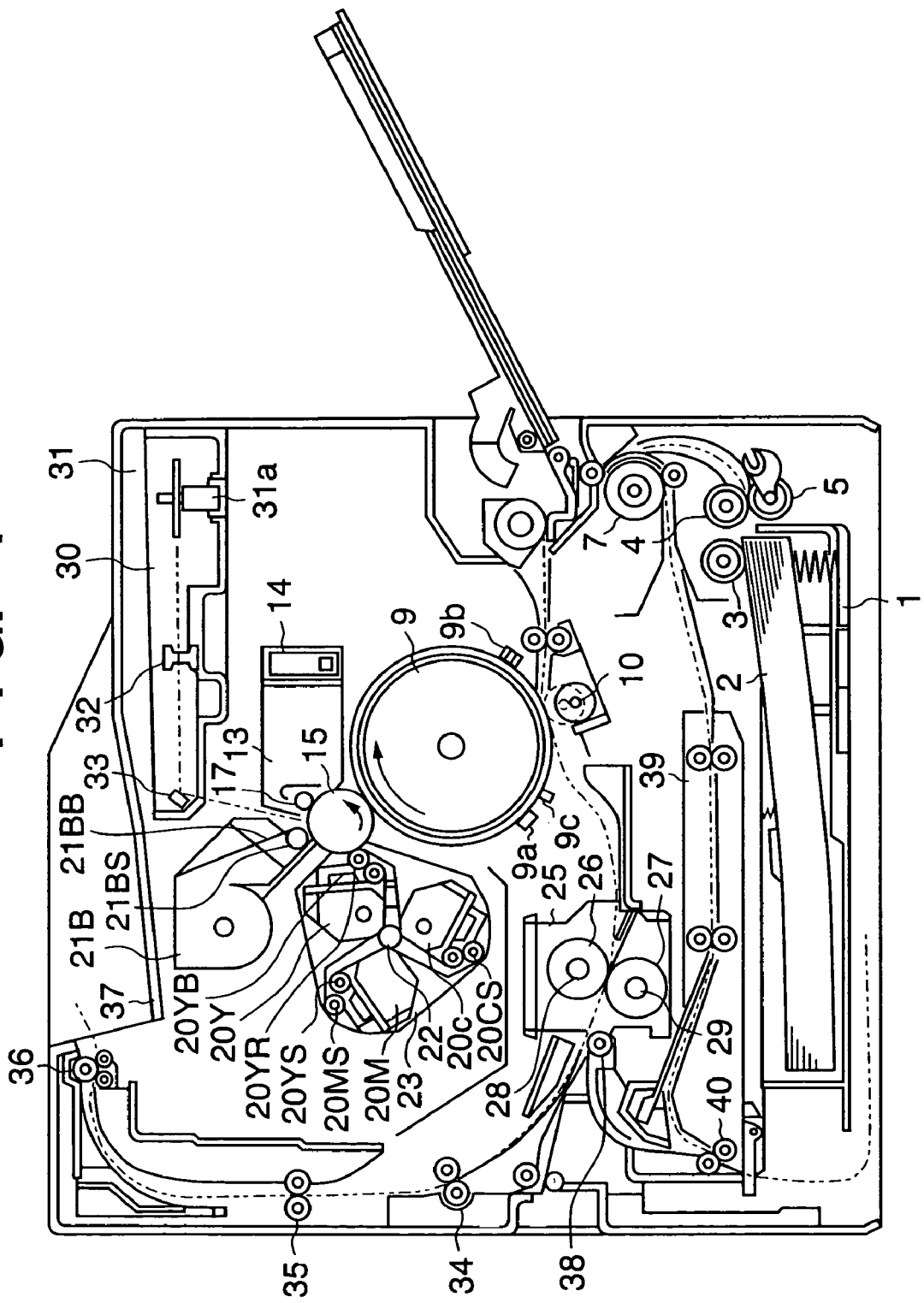
FIG. 4 is a sectional view for explaining a printer according to the present invention.

FIG. 4 is a sectional view showing a color laser printer having a double-sided printing function as an example of the printer 500.

This printer forms an electrostatic latent image by scanning a photosensitive drum 15 with a laser beam which is modulated by image data of each color obtained on the basis of printing data input from the host computer 3000. The electrostatic latent image is developed with toner to obtain a visible image. Visible images for all colors are transferred to an intermediate transfer-member 9 to form a color visible image. The color visible image is transferred to a transfer medium 2 to fix the image onto the transfer medium 2. An image forming section which performs this control comprises a drum unit having the photosensitive drum 15, a primary electrification section having a charged contact roller 17, a cleaning section, a developing section, a sheet feed section which includes the intermediate transfer member 9, a sheet cassette 1, and various rollers 3, 4, 5, and 7, a transfer section which includes a transfer roller 10, and a fixing section 25.

A drum unit 13 is constituted by integrating the photosensitive drum (photosensitive member) 15, and a cleaner vessel 14 having a cleaning mechanism also serving as the holder of the photosensitive drum 15. The drum unit 13 is detachably supported by the printer main body, and can be replaced in accordance with the service life of the photosensitive drum 15. The photosensitive drum 15 is formed by coating the outer surface of an aluminum cylinder with an organic photoconductive layer, and rotatably supported by the cleaner vessel 14. The photosensitive drum 15 is rotated by transmitting the driving force of a driving motor (not shown). The driving motor rotates the photosensitive drum 15 counterclockwise in accordance with image forming operation. The surface of the photosensitive drum 15 is selectively exposed to form an electrostatic latent image. In a scanner section 30, a modulated laser beam is reflected by a polygon mirror which is rotated by a motor 31a in synchronism with the horizontal sync signal of an image signal, and the photosensitive drum is irradiated with the laser beam via a lens 32 and reflecting mirror 33.

The developing section comprises three color developing units 20Y, 20M, and 20C which develop images in yellow (Y), magenta (M), and cyan (C), and one black developing unit 21B which develops an image in black (B). The color developing units 20Y, 20M, and 20C and the black developing unit 21B respectively comprise sleeves 20YS, 20MS, 20CS, and 21BS, and spreading blades 20YB, 20MB, 20CB, and 21BB which are respectively pressed against the outer surfaces of the sleeves 20YS, 2OMS, 20CS, and 21BS. The three color developing units 20Y, 20M, and 20C comprise spreading rollers 20YR, 20MR, and 20CR.

The black developing unit 21B is detachably attached to the printer main body. The color developing units 20Y, 20M, and 20C are detachably attached to a developing rotary 23 which rotates by using a rotation shaft 22 as a center.

The sleeve 21BS of the black developing unit 21B is spaced apart from the photosensitive drum 15 at a small interval of, e.g., about 300 μm. The black developing unit 21B supplies toner by an internal supply member, and electrifies toner by triboelectrification so as to apply toner by the spreading blade 21BB to the outer surface of the sleeve 21BS which rotates clockwise. A developing bias is applied to the sleeve 21BS to develop an electrostatic latent image on the photosensitive drum 15, thus forming a visible image with black toner on the photosensitive drum 15.

In forming an image, the three color developing units 20Y, 20M, and 20C rotate along with rotation of the developing rotary 23. The predetermined sleeves 20YS, 2OMS, and 20CS face the photosensitive drum 15 at a small interval of about 300 μm. The predetermined color developing units 20Y, 20M, and 20C stop at a developing position where they face the photosensitive drum 15, and visible images on the photosensitive drum 15.

In forming a color image, the developing rotary 23 rotates every rotation of the intermediate transfer member 9, and the developing step is done in order of the yellow developing unit 20Y, magenta developing unit 20M, cyan developing unit 20C, and black developing unit 21B. The intermediate transfer member 9 rotates four times to sequentially form visible images with yellow, magenta, cyan, and black toners. As a result, a full-color visible image is formed on the intermediate transfer member 9.

The intermediate transfer member 9 is so constituted as to rotate along with rotation of the photosensitive drum 15 in contact with the photosensitive drum 15. In forming a color image, the intermediate transfer member 9 rotates clockwise to receive multiple transfer of four visible images from the photosensitive drum 15. In forming an image, the transfer roller 10 (to be described later) is brought into contact with the intermediate transfer member 9, the transfer medium 2 is clamped and conveyed, and multiple color visible images on the intermediate transfer member 9 are simultaneously transferred to the transfer medium 2. A TOP sensor 9a and RS sensor 9b for detecting the position of the intermediate transfer member 9 in the rotational direction, and a density sensor 9c for detecting the density of a toner image transferred onto the intermediate transfer member are arranged on the outer surface of the intermediate transfer member 9.

The transfer roller 10 comprises a transfer charger which is so supported as to be brought into contact with or separated from the photosensitive drum 15. The transfer roller 10 is formed by winding a middle-resistance foamed elastic member on a metal axis.

As represented by the solid line in FIG. 4, the transfer roller 10 is separated down so as not to disturb a color visible image while multiple color visible images are transferred onto the intermediate transfer member 9. After color visible images in the four colors are formed on the intermediate transfer member 9, the transfer roller 10 is positioned upward, as represented by the dotted line in FIG. 4, by a cam member (not shown) in synchronism with the timing at which the color visible images are transferred onto the transfer medium 2. The transfer roller 10 is pressed against the intermediate transfer member 9 at a predetermined press force via the transfer medium 2. At the same time, a bias voltage is applied to transfer the color visible images on the intermediate transfer member 9 onto the transfer medium 2.

The fixing section 25 fixes the transferred color visible image while the transfer medium 2 is conveyed. The fixing section 25 comprises a fixing roller 26 which heats the transfer medium 2, and a press roller 27 which brings the transfer medium 2 into press contact with the fixing roller 26. The fixing roller 26 and press roller 27 are hollow, and incorporate heaters 28 and 29. That is, the transfer medium 2 bearing the color visible image is conveyed by the fixing roller 26 and press roller 27, and the toner is fixed onto the surface of the transfer medium 2 by applying heat and the pressure.

The transfer medium 2 on which the visible image is fixed is discharged to a delivery section 37 by delivery rollers 34, 35, and 36, thereby ending image forming operation.

The cleaning means cleans the toner left on the photosensitive drum 15 and intermediate transfer member 9. Waste toner after a visible toner image formed on the photosensitive drum 15 is transferred to the intermediate transfer member 9, or waste toner after color visible images in four colors formed on the intermediate transfer member 9 are transferred to the transfer medium 2 is stored in the cleaner vessel 14.

A transfer medium (printing sheet) 2 subjected to printing is picked up from the sheet cassette 1 by the pickup roller 3, and so conveyed as to be sandwiched between the intermediate-transfer member 9 and the transfer roller 10. A color toner image is printed on the transfer medium 2, and the transfer medium 2 passes through the fixing section 25 to fix the toner image. In single-sided printing, a guide 38 forms a convey path so as to guide a printing sheet to the upper delivery section. In double-sided printing, the guide 38 forms a path so as to guide a printing sheet to a lower double-sided printing unit.

A printing sheet guided to the double-sided printing unit is temporarily fed below the tray 1 (convey path represented by a chain double-dashed line) by a convey roller 40, then conveyed in an opposite direction, and fed to a double-sided printing tray 39. The sheet is turned upside down from the state on the sheet cassette 1 on the double-sided printing tray 39, and the convey direction is reversed. In this state, a toner image is transferred and fixed again to realize double-sided printing Other Embodiment As another embodiment, data may be transmitted from an application to a device without the mediacy of any graphic engine. In this case, the printer driver is directly instructed to issue a command without performing color command transmission preparation processing 703 or monochrome command transmission preparation processing 704. The printing application is different from that in the first embodiment in that data is created in accordance with not the graphic engine but the printer driver interface and the printer driver invokes a prepared function.

The present invention may be applied to a system including a plurality of devices. (e.g., a host computer, interface device, reader, and printer) or an apparatus (e.g., a copying machine, printer, or facsimile apparatus) formed from a single device.

The present invention can be summarized into the following arrangement.

(1) An information processing apparatus having a generation function of generating printing data to be transmitted to a printer comprises a save unit which saves printing data of each original page in an intermediate format together with printing setting data, a printing controller which causes the user to change a printing setting and issue a printing instruction, and a printing data reading unit which reads out the printing setting data from the save unit in accordance with the printing instruction, changes the color mode setting of the read printing setting data in accordance with the color mode setting in the printer that is changed by the printing controller, and generates by using the generation function the printing data containing an instruction of changing the color mode on the basis of the printing setting data.

(2) In (1), the printing setting changed by the printing controller includes the color mode setting of each original page in the printer, and the printing data reading unit changes the color mode setting of the read printing setting data for each printing medium including the original page whose printing setting has been changed.

(3) In (1), the printing setting changed by the printing controller includes the color mode setting of each chapter formed by a plurality of original pages in the printer, and the printing data reading unit changes the color mode setting of the read printing setting data for a set of printing media corresponding to the chapter whose printing setting has been changed.

(4) In (1), the printing data reading unit determines whether the printer copes with a change of the color mode before the printing data containing the instruction of changing the color mode is generated by using the generation function, when the printer copes with the change, generates, by using the generation function, printing data containing the instruction of changing the color mode, and when the printer does not cope with the change, generates; by using the generation function, printing data containing no instruction of changing the color mode.

(5) In (1), the printing data reading unit determines whether the printing setting changed by the printing controller includes the color mode setting of each original page in the printer, when the printing setting includes the color mode setting of each original page, changes the color mode setting of the read printing setting data for each printing medium including the original page whose printing setting has been changed, when the printing setting does not include the color mode setting of each original page, determines whether the printing setting includes the color mode setting of each chapter formed by a plurality of original pages in the printer, when the printing setting includes the color mode setting of each chapter, changes the color mode setting of the read printing setting data for a set of printing media corresponding to the chapter whose printing setting has been changed, and when the printing setting does not include the color mode setting of each chapter, changes the color mode setting of the whole printing data in the printer.

(6) The present invention also includes a method corresponding to any one of (1) to (5).

(7) The present invention also includes a computer program for executing a printing control method using a generation function of generating printing data to be transmitted to a printer, wherein the computer program executes a save step of saving printing data of each original page in an intermediate format together with printing setting data, a printing control step of causing the user to change a printing setting and issue a printing instruction, and a printing data reading step of reading out the printing setting data in the save step in accordance with the printing instruction, changing the color mode setting of the read printing setting data in accordance with the color mode setting in the printer that is changed in the printing control step, and generating by using the generation function the printing data containing an instruction of changing the color mode on the basis of the printing setting data.

(8) The present invention also includes an information processing apparatus having a generation function of generating printing data to be transmitted to a printer, comprising a spooler which stores a document file containing printing setting data and printing data of each original page in an intermediate format, a printing control application which provides the user with an operation window which is mapped from the document file in order to change a printing setting and issue a printing instruction, and a despooler which reads out the printing setting data from the spooler in accordance with the printing instruction, changes the color mode setting of the read printing setting data in accordance with the color mode setting in the printer that is changed by the printing control application, and generates by using the generation function the printing data containing an instruction of changing the color mode on the basis of the printing setting data.

The object of the present invention is also achieved when a storage medium which stores software program codes for realizing the functions of the above-described embodiments are read out and executed by the computer (or the CPU or MPU) of a system or apparatus.

In this case, the program codes read out from the storage medium realize the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

Furthermore, the present invention includes a case where, after the program codes read out from the storage medium are written in the memory of a function expansion board inserted into the computer or the memory of a function expansion unit connected to the computer, the CPU of the function expansion board or function expansion unit performs part or all of actual processing on the basis of the instructions of the program codes and thereby realizes the functions of the above-described embodiments.

As has been described above, the present invention can provide a mechanism capable of designating color printing or monochrome printing in a printer in accordance with settings desired by the user for a document of pages that is created by an application, and performing printing processing designated by the user.

More specifically, color/monochrome exceptional setting for each page or chapter is done by a printing control application. The color/monochrome printing mode in the printer can be switched for each page or chapter in one output operation.

A page to be printed in monochrome can be printed in monochrome, saving the expandable and charging of the page. Arrangement of printouts or the like can also be achieved using an optional function of the printer.

The present invention is not limited to the above embodiments and various changes and modifications can be made within the spirit and scope of the present invention. Therefore, to apprise the public of the scope of the present invention, the following claims are made.

What is claimed is:

1. An information processing apparatus generating print data sent to a printer, comprising:
   a determining unit constructed to determine whether imported data is image data based on a file extension of the imported data;
   a generating unit constructed to generate document data by inserting a new chapter for the imported data into the document data when the determining unit determines that the imported data is not image data, and by inserting the imported data into an existing chapter when the determining unit determines that the imported data is image data;
   a first display unit constructed to display a first setting screen to set an entire color mode defining a color mode to be applied to the entire document data generated by the generating unit;
   a second display unit constructed to display a second setting screen to set a chapter color mode defining the color mode to be applied to a selected chapter including a plurality of pages of the document data generated by the generating unit, wherein the second setting screen is a window different from the first setting screen;
   a third display unit constructed to display a third setting screen to set a page color mode defining the color mode to be applied to a selected page of the document data generated by the generating unit, wherein the third setting screen is a window different from the first setting screen and the second setting screen; and
   a print data generating unit configured to generate print data including a color mode changing command so that a printer prints a printed material on which the color mode defined by the page color mode is applied to the selected page and the color mode defined by the chapter color mode is applied to the selected chapter and the color mode defined by the entire color mode is applied to the remaining portion of the document data to which the page color mode and the chapter color mode are not applied when the entire color mode is set in accordance with an instruction received via the first setting screen displayed by the first display unit, the chapter color mode is set in accordance with an instruction received via the second setting screen displayed by the second display unit and the page color mode is set in accordance with an instruction received via the third setting screen displayed by the third display unit.

2. The apparatus according to claim 1, wherein the printing data generating unit determines whether the printer copes with a change of the color mode before the print data containing the instruction of changing the color mode is generated by using a generating function to generate the print data, when the printer copes with the change, generates, by using the generating function, printing data containing the instruction of changing the color mode, and when the printer does not cope with the change, generates, by using the generating function, print data containing no instruction of changing the color mode.

3. A print data generating method sent to a printer, comprising:
   a determining step of determining whether imported data is image data based on a file extension of the imported data;
   a generating step of generating document data by inserting a new chapter for the imported data into the document data when the determining step determines that the imported data is not image data, and by inserting the imported data into an existing chapter when the determining step determines that the imported data is image data;
   a first display step of displaying a first setting screen to set an entire a color mode defining a color mode to be applied to a the entire document data generated by the generating step;
   a second display step of displaying a second setting screen to set a chapter color mode defining the color mode to be applied to a selected chapter including a plurality of pages of the document data generated by the generating step, wherein the second setting screen is a window different from the first setting screen;
   a third display step of displaying a third setting screen to set a page color mode defining the color mode to be applied to a selected page of the document data generated by the generating step, wherein the third setting screen is a window different from the first setting screen and the second setting screen; and
   a print data generating step of generating print data including a color mode changing command so that a printer prints a printed material on which the color mode defined by the page color mode is applied to the selected page and the color mode defined by the chapter color mode is applied to the selected chapter and the color mode defined by the entire color mode is applied to the remaining portion of the document data to which the page color mode and the chapter color mode are not applied when the entire color mode is set in accordance with an instruction received via the first setting screen displayed in the first display step, the partial color mode is set in accordance with an instruction received via the second setting screen displayed in the second display step and the page color mode is set in accordance with an instruction received via the third setting screen displayed in the third display step.

4. The method according to claim 3, wherein, in the print data generating step, whether the printer copes with a change of the color mode is determined before the print data containing the instruction of changing the color mode is generated by using a generating function to generate the print data, when the printer copes with the change, print data containing the instruction of changing the color mode is generated by using the generating function, and when the printer does not cope with the change, print data containing no instruction of changing the color mode is generated by using the generating function.

5. A non-transitory computer-readable medium storing a printing control program, which causes a computer to perform a print data generating method of generating print data sent to a printer, the method comprising: a determining step of determining whether imported data is image data based on a file extension of the imported data; a generating step of generating document data by inserting a new chapter for the imported data into the document data when the determining step determines that the imported data is not image data, and by inserting the imported data into an existing chapter when the determining step determines that the imported data is image data; a first display step of displaying a first display screen to set an entire color mode defining a color mode to be applied to the entire document data generated by the generating step; a second display step of displaying a second setting screen to set a chapter color mode defining the color mode to be applied to a selected chapter including a plurality of pages of the document data generated by the generating step, wherein the second setting screen is a window different from the first setting screen; a third display step of displaying a third setting screen to set a page color mode defining the color mode to be applied to a selected page of the document data generated by the generating step, wherein the third setting screen is a window different from the first setting screen and the second setting screen; and a print data generating step of generating print data including a color mode changing command so that a printer prints a printed material on which the color mode defined by the page color mode is applied to the selected page and the color mode defined by the chapter color mode is applied to the selected chapter and the color mode defined by the entire color mode is applied to the remaining portion of the document data to which the page color mode and the chapter color mode are not applied when the entire color mode is set in accordance with an instruction received via the first setting screen displayed in the first display step, the partial color mode is set in accordance with an instruction received via the second setting screen displayed in the second display step and the page color mode is set in accordance with an instruction received via the third setting screen displayed in the third display step.

6. The non-transitory computer-readable medium storing a printing control program according to claim 5, wherein in the print data generating step, whether the printer copes with a change of the color mode is determined before the print data containing the instruction of changing the color mode is generated by using a generating function to generate the print data, when the printer copes with the change, print data containing the instruction of changing the color mode is generated by using the generating function, and when the printer does not cope with the change, print data containing no instruction of changing the color mode is generated by using the generating function.

7. The apparatus according to claim 1, wherein the entire color mode is set for specifying whether color printing or monochrome printing is performed for the entire document data, and the partial color mode is set for specifying whether color printing or monochrome printing is performed for the predetermined unit of the document data.

8. The method according to claim 3, wherein the entire color mode is set for specifying whether color printing or monochrome printing is performed for the entire document data, and the partial color mode is set for specifying whether color printing or monochrome printing is performed for the predetermined unit of the document data.

9. The non-transitory computer-readable medium storing a printing control program according to claim 5, wherein the entire color mode is set for specifying whether color printing or monochrome printing is performed for the entire document data, and the partial color mode is set for specifying whether color printing or monochrome printing is performed for the predetermined unit of the document data.

* * * * *